US008091735B2

(12) United States Patent
Girard et al.

(10) Patent No.: US 8,091,735 B2
(45) Date of Patent: Jan. 10, 2012

(54) LIQUID DISPENSING SYSTEM

(75) Inventors: Jeffrey J. Girard, Scottsdale, AZ (US);
Nasser Pirshafiey, Thousand Oaks, CA (US); Mario E. Vassaux, Scottsdale, AZ (US); Heather B. Kay, Mesa, AZ (US); Shlomo Greenwald, Ithaca, NY (US); Zipora Greenwald, Ithaca, NY (US); Paul Van Den Hoonaard, Peach Tree City, GA (US)

(73) Assignee: Intelligent Coffee Company, LLC, Scottsdale, AZ (US)

( * ) Notice: Subject to any disclaimer, the term of this patent is extended or adjusted under 35 U.S.C. 154(b) by 711 days.

(21) Appl. No.: 11/926,931

(22) Filed: Oct. 29, 2007

(65) Prior Publication Data

US 2008/0173705 A1 Jul. 24, 2008

Related U.S. Application Data

(63) Continuation-in-part of application No. PCT/US2006/042878, filed on Nov. 2, 2006, and a continuation-in-part of application No. 11/055,832, filed on Feb. 11, 2005, now Pat. No. 7,594,525, and a continuation-in-part of application No. 11/055,915, filed on Feb. 11, 2005, now Pat. No. 7,614,524, and a continuation-in-part of application No. 11/209,016, filed on Aug. 22, 2005, now Pat. No. 7,578,419.

(60) Provisional application No. 60/845,310, filed on Sep. 18, 2006, provisional application No. 60/794,777, filed on Apr. 25, 2006, provisional application No. 60/544,379, filed on Feb. 13, 2004, provisional application No. 60/620,251, filed on Oct. 19, 2004, provisional application No. 60/642,311, filed on Jan. 7, 2005, provisional application No. 60/682,107, filed on May 18, 2005, provisional application No. 60/700,824, filed on Jul. 20, 2005.

(51) Int. Cl.
*B22D 41/00* (2006.01)
*B67D 3/00* (2006.01)
(52) U.S. Cl. ......... 222/54; 222/63; 222/105; 222/129.3; 222/325; 222/333; 222/504; 222/509
(58) Field of Classification Search ................. 222/335, 222/146.6, 129.3, 246, 52, 63, 504, 509, 222/333, 439, 453, 325, 38, 6.5
See application file for complete search history.

(56) References Cited

U.S. PATENT DOCUMENTS 1,949,661 A * 3/1934 Schell ........................ 222/335
(Continued)

FOREIGN PATENT DOCUMENTS

DE 2921579 12/1980
(Continued)

*Primary Examiner* — Kevin P Shaver
*Assistant Examiner* — Melvin A Cartagena
(74) *Attorney, Agent, or Firm* — Volpe and Koenig, P.C.

(57) ABSTRACT

An improved concentrated/extract cartridge is provided for dispensing a liquid in an accurate and repeatable manner. The cartridge includes an electromagnetically actuated piston connected to a value. The piston includes an exterior ring supported by a hollow interior web that is configured to permit a flow of fluid into the dispensing tube when the value body is in contact with the value seat. A membrane is located below the web and is in sealing contact with the internal ring when the piston is activated. This allows a precise and repeatable amount of the liquid to be dispensed with each stroke. Dispensers for dispensing the liquid from the cartridge for a number of applications are also provided. The dispensers each include an actuating coil into which the dispensing tube is inserted. A controller is connected to the coil for controlling the actuation of the piston/value assembly for dispensing the fluid in the cartridge as required for the particular application.

34 Claims, 23 Drawing Sheets

U.S. PATENT DOCUMENTS

| | | | |
|---|---|---|---|
| 3,727,632 A * | 4/1973 | Pansini | 137/268 |
| 4,011,969 A | 3/1977 | Martin | |
| 4,096,893 A | 6/1978 | Harvey, Jr. et al. | |
| 4,164,964 A | 8/1979 | Daniels | |
| 4,518,105 A | 5/1985 | Kuckens et al. | |
| 4,598,845 A | 7/1986 | Ozdemir | |
| 4,660,742 A * | 4/1987 | Ozdemir | 222/36 |
| 4,791,859 A | 12/1988 | King | |
| 4,808,346 A | 2/1989 | Strenger | |
| 4,887,740 A | 12/1989 | Smith | |
| 4,901,886 A | 2/1990 | Kirschner | |
| 4,901,890 A * | 2/1990 | Mivelaz | 222/395 |
| 4,903,586 A | 2/1990 | King | |
| 5,193,593 A | 3/1993 | Denis et al. | |
| 5,197,865 A | 3/1993 | Sevrain et al. | |
| 5,269,443 A * | 12/1993 | Lancaster | 222/207 |
| 5,477,883 A | 12/1995 | Totten | |
| 5,662,461 A | 9/1997 | Ono | |
| 5,836,482 A | 11/1998 | Ophardt et al. | |
| 5,909,846 A | 6/1999 | Sasaki | |
| 5,918,768 A | 7/1999 | Ford | |
| 5,975,357 A * | 11/1999 | Topar | 222/56 |
| 6,173,117 B1 * | 1/2001 | Clubb | 392/442 |
| 6,209,751 B1 | 4/2001 | Goodin et al. | |
| 6,394,312 B1 * | 5/2002 | Endou | 222/129.1 |
| 6,564,968 B1 * | 5/2003 | Terrell et al. | 222/63 |
| 6,651,849 B2 | 11/2003 | Schroeder et al. | |
| 6,662,976 B2 | 12/2003 | Jensen et al. | |
| 6,676,908 B2 | 1/2004 | Robinson, Sr. et al. | |
| 6,708,741 B1 | 3/2004 | Berry et al. | |
| 6,722,527 B1 | 4/2004 | Krauss | |
| 6,810,931 B2 | 11/2004 | Graffin et al. | |
| 6,886,556 B2 * | 5/2005 | Fuchs | 128/200.14 |
| 7,048,149 B1 | 5/2006 | Lassota | |
| 7,077,339 B2 | 7/2006 | Leach | |
| 7,104,184 B2 | 9/2006 | Biderman et al. | |
| 7,182,280 B2 * | 2/2007 | Ye et al. | 239/526 |
| 7,578,419 B2 | 8/2009 | Greenwald et al. | |
| 7,594,525 B2 | 9/2009 | Girard et al. | |
| 7,896,202 B2 | 3/2011 | Greenwald et al. | |
| 2004/0074921 A1 | 4/2004 | Lips et al. | |
| 2004/0084475 A1 | 5/2004 | Bethuy et al. | |
| 2004/0226962 A1 | 11/2004 | Mazursky et al. | |
| 2006/0144244 A1 | 7/2006 | Girard et al. | |
| 2008/0029541 A1 | 2/2008 | Wallace et al. | |

FOREIGN PATENT DOCUMENTS

| | | |
|---|---|---|
| DE | 19523816 | 1/1997 |
| FR | 2813861 | 3/2002 |
| JP | 03129494 | 3/1991 |
| JP | 3129494 | 6/1991 |
| JP | 6211299 | 8/1994 |
| JP | 06211299 | 8/1994 |
| WO | 0079224 | 12/2000 |
| WO | 0149154 | 7/2001 |
| WO | 2004104527 | 12/2004 |

* cited by examiner

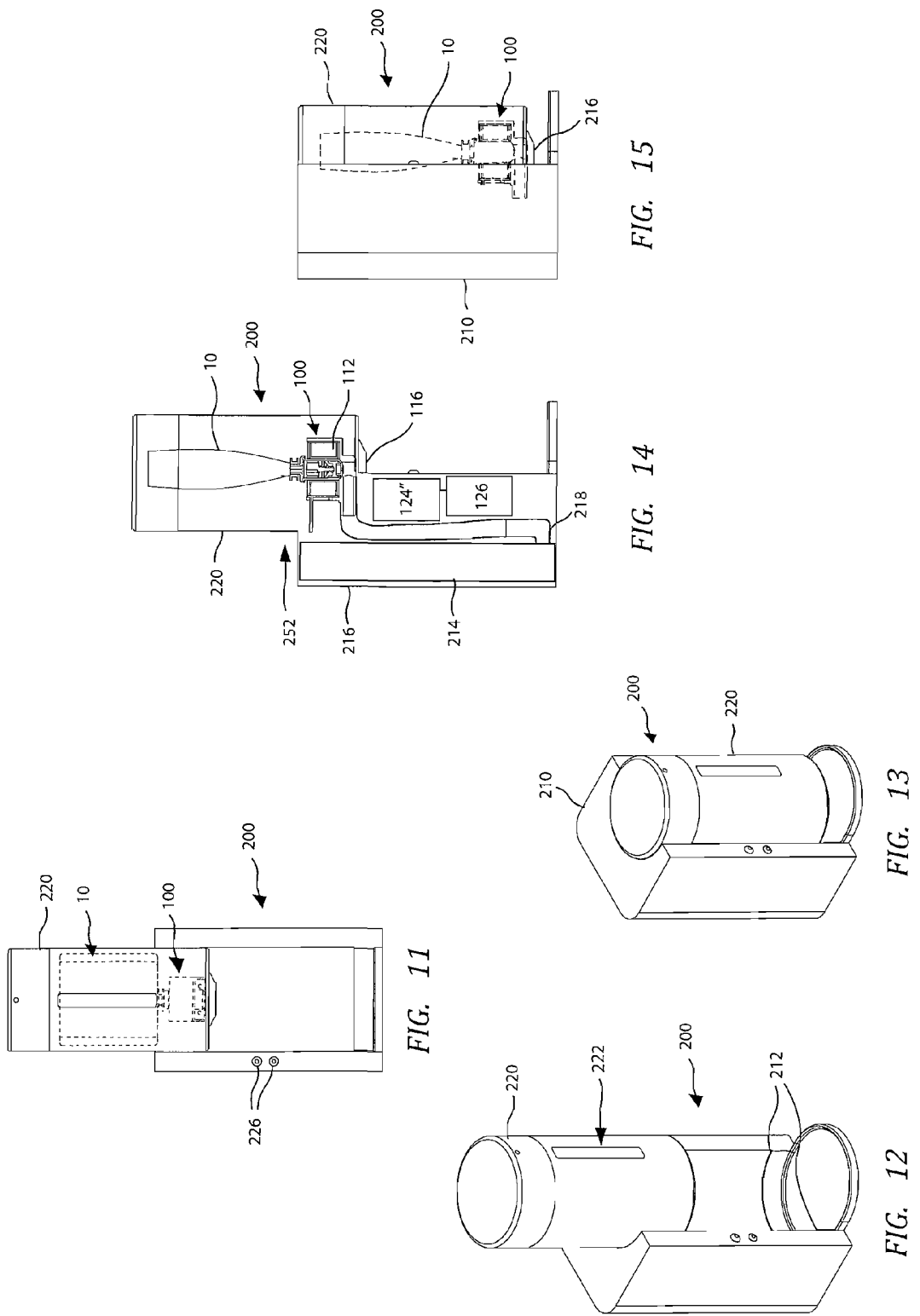

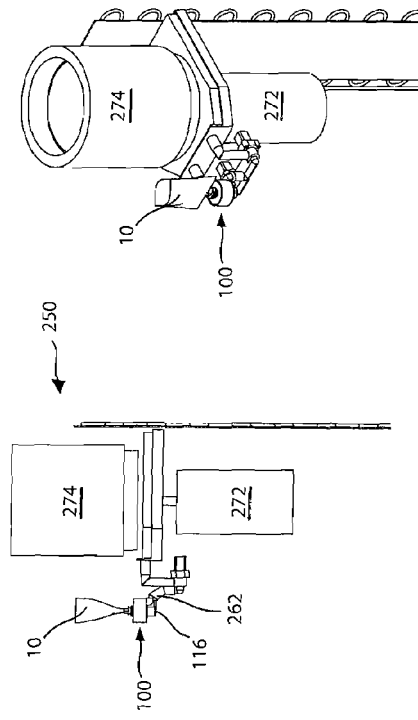
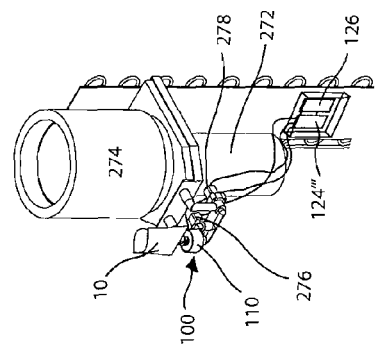
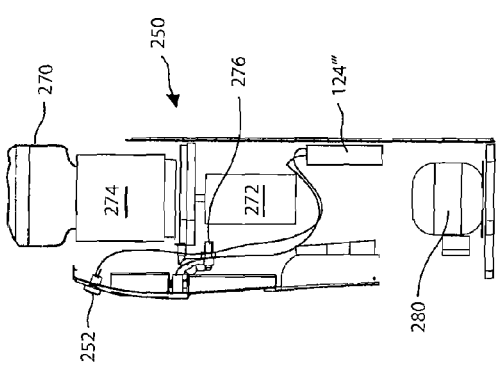
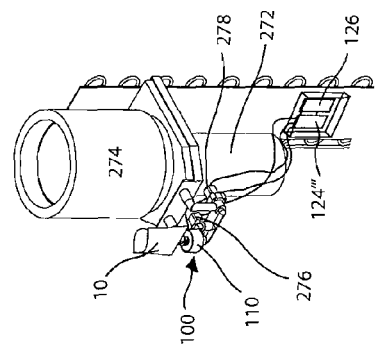
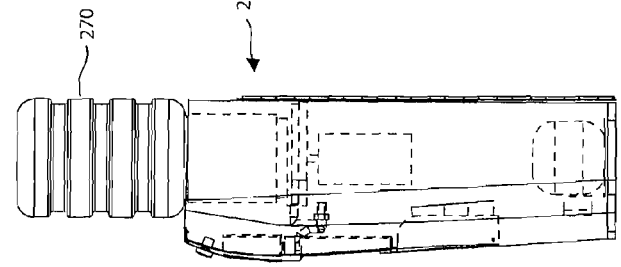
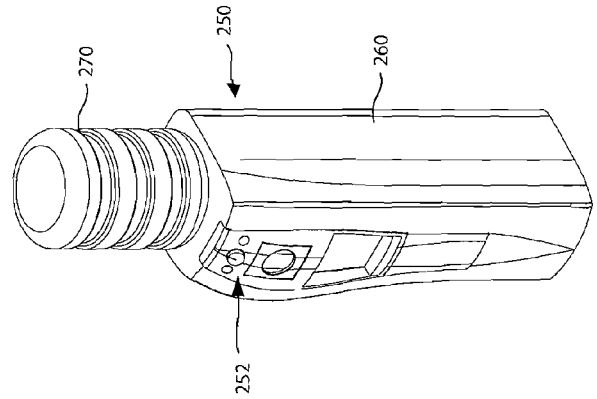

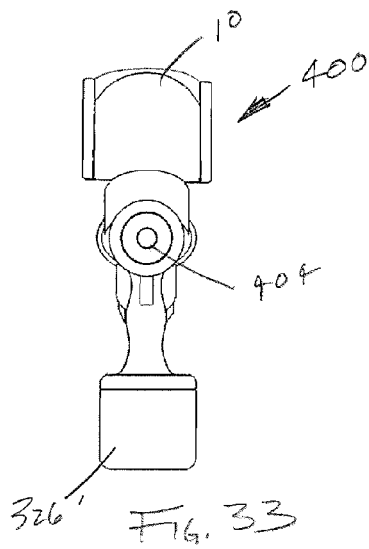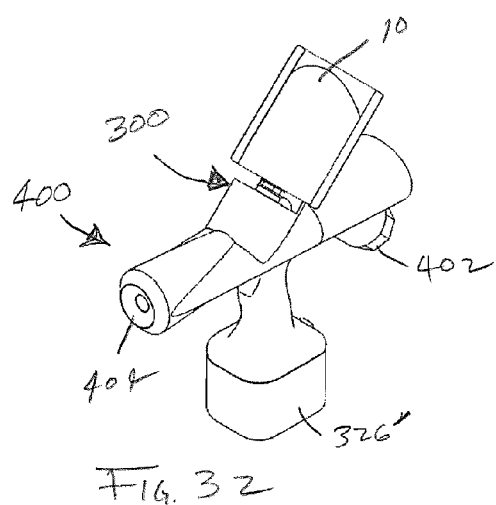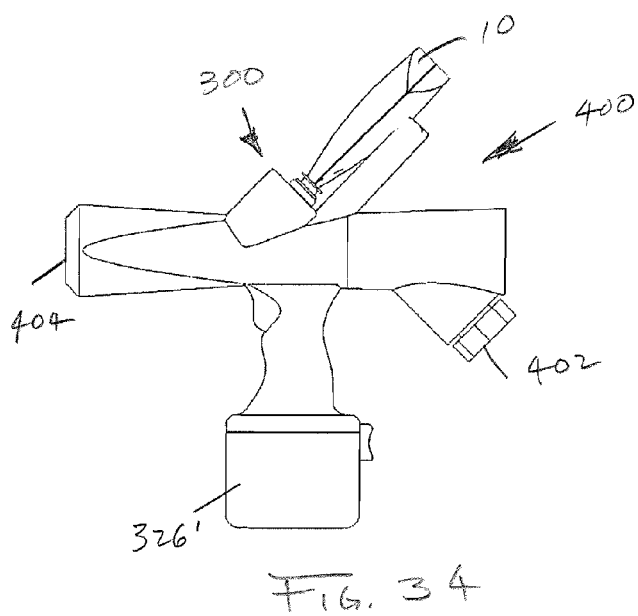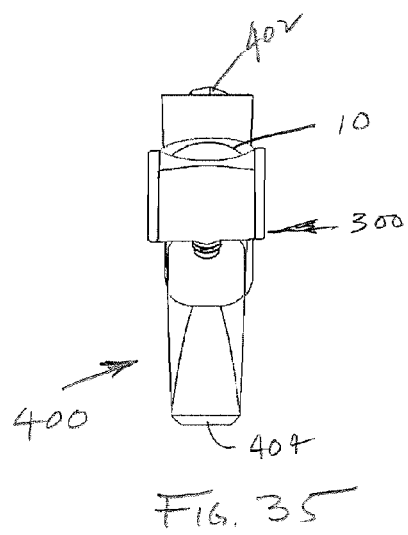

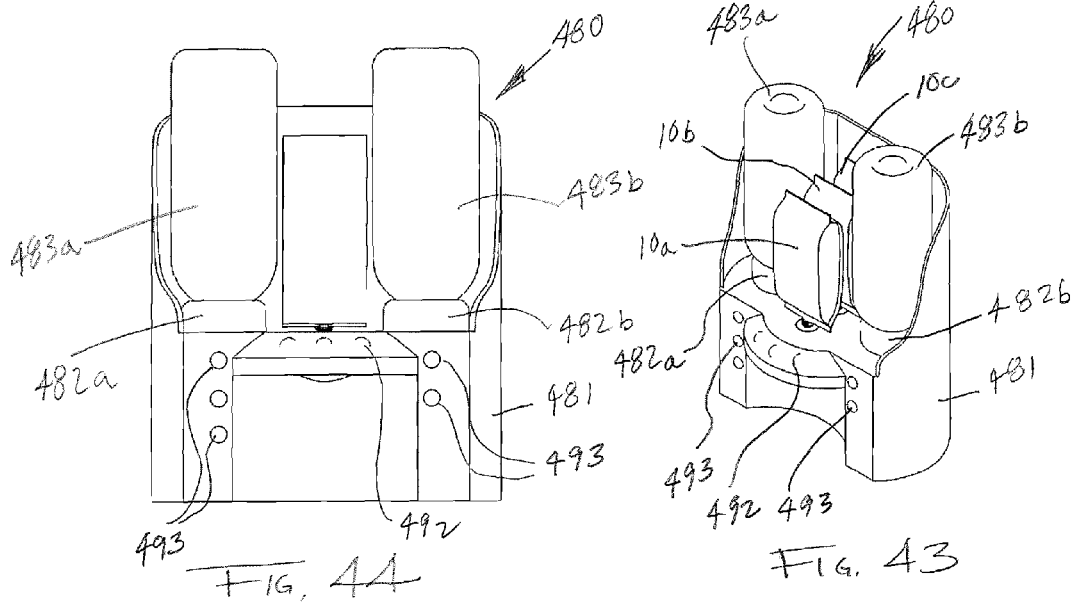
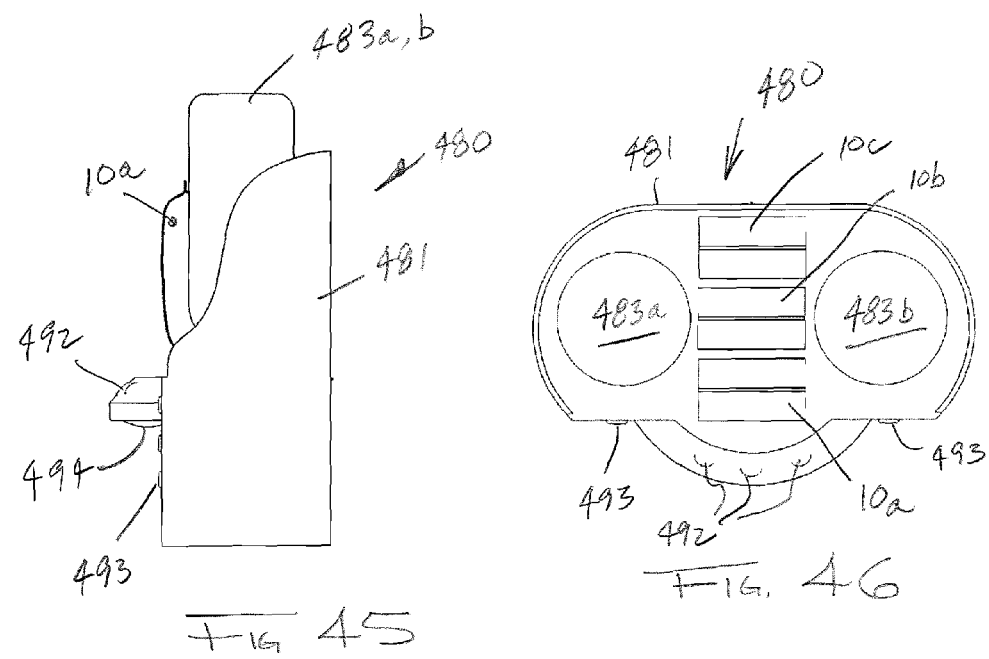

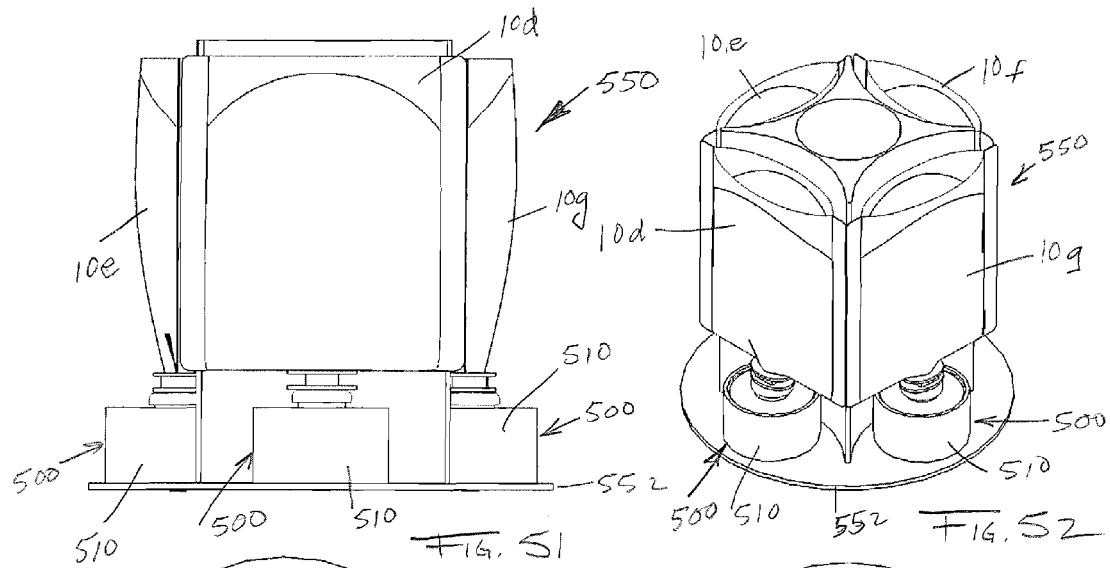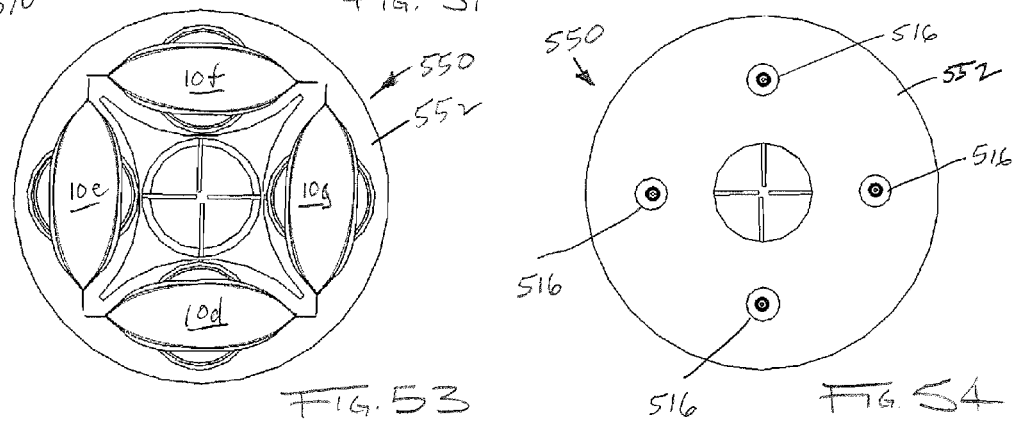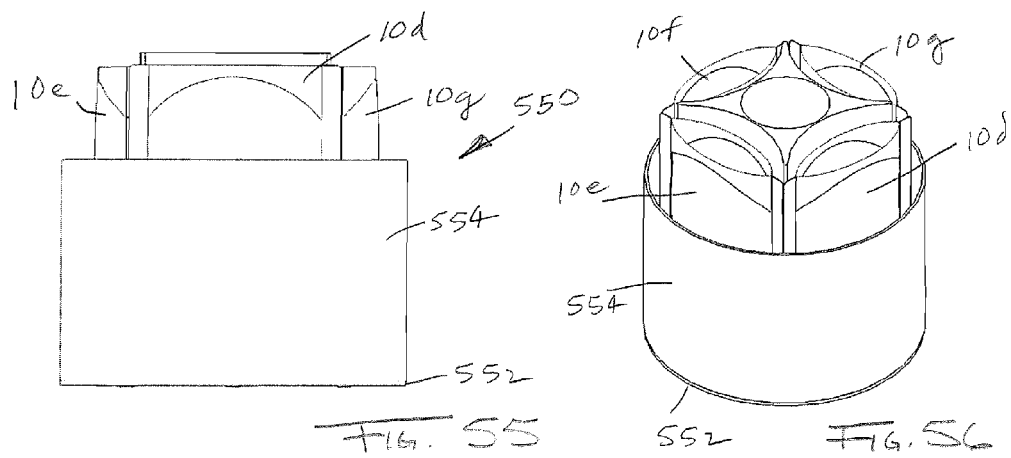

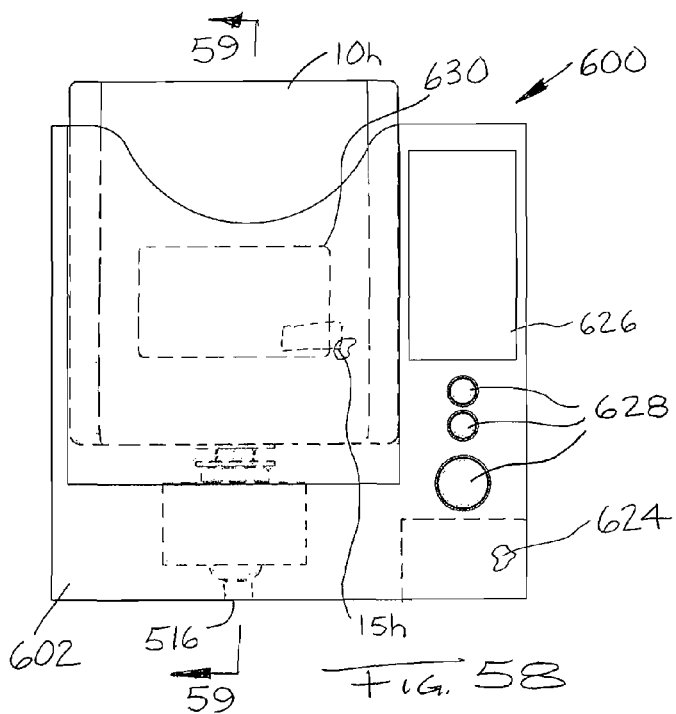
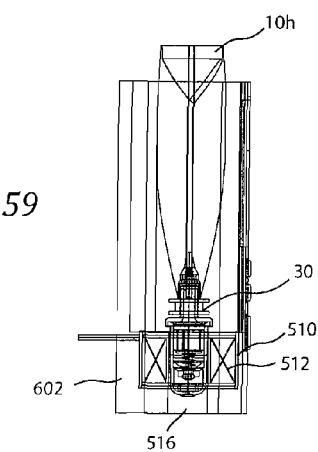
FIG. 59
FIG. 58
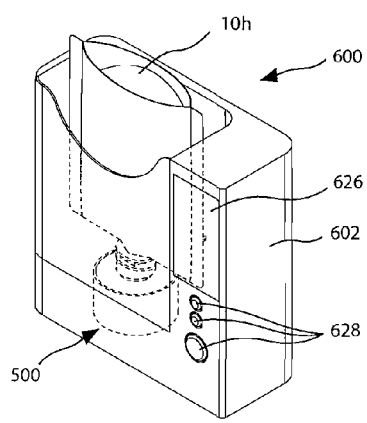
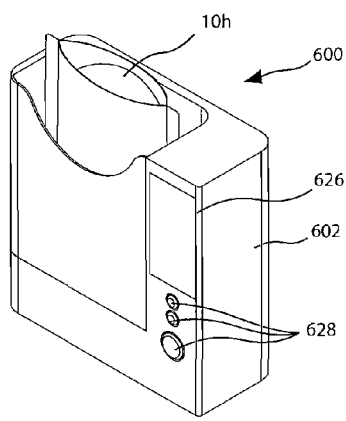
FIG. 60  FIG. 61

LIQUID DISPENSING SYSTEM

This application is a continuation-in-part of PCT/US2006/042878, filed Nov. 2, 2006, which claims priority to U.S. application Ser. No. 11/266,695, filed Nov. 3, 2005, and claims the benefit of U.S. Provisional Appln. No. 60/845,310, filed Sep. 18, 2006 and U.S. Provisional Appln. No. 60/794,777, filed Apr. 25, 2006. This application is also a continuation-in-part of U.S. patent application Ser. No. 11/055,832 now U.S. Pat. No. 7,594,525 and Ser. No. 11/055,915 now U.S. Pat. No. 7,614,524, both filed Feb. 11, 2005, and both claiming the benefit of U.S. provisional application No. 60/544,379, filed Feb. 13, 2004, U.S. provisional application No. 60/620,251, filed Oct. 19, 2004, and U.S. provisional application No. 60/642,311, filed Jan. 7, 2005, which are incorporated by reference as if fully set forth. This application is also a continuation-in-part of U.S. patent application Ser. No. 11/209,016, filed Aug. 22, 2005 now U.S. Pat. No. 7,578,419 which claims the benefit of U.S. provisional application No. 60/642,311, filed Jan. 7, 2005, U.S. provisional application No. 60/682,107, filed May 18, 2005, and U.S. provisional application No. 60/700,824, filed Jul. 20, 2005. All of these prior applications are incorporated be reference herein as if fully set forth.

BACKGROUND

The present invention relates to dispensing systems which dispense fluids in an exact metered fashion. More particularly, the invention relates to dispensing systems used by distributors or consumers for completing a variety of tasks to increase personal efficiency.

For years, consumers have been inundated with numerous consumable liquid products which are used and re-purchased frequently. Consumable products such as beverages, baby formulas, detergents, and medicines are often cumbersome to mix and/or dispense in proper amounts, and require appreciable amounts of storage space. It would be desirable to provide a system which allows for the dispensing of liquid consumable products in a manageable and convenient manner for a number of different applications.

SUMMARY

Briefly stated, the present invention is directed to an improved cartridge for dispensing a liquid in an accurate and repeatable manner. The improved cartridge includes a hollow body with a dispensing tube connected to the hollow body. A piston is slidably contained by an interior surface of the dispensing tube. A valve having a valve stem that passes through a port of a valve seat in the dispensing tube is connected to the piston via the stem. The port defines a flow passage through the dispensing tube. The valve body located at the second end of the valve stem is in removable contact with the valve seat and is biased to a closed position. The piston includes an exterior ring supported by a hollow interior web that is configured to permit a flow of fluid into the dispensing tube when the valve body is in contact with the valve seat. A metallic ring is located over the first ring to permit electromagnetic actuation of the piston. A membrane is located below the web and is in sealing contact with the internal ring when the piston is activated. In a preferred embodiment, the membrane does not contact the metal ring when it is in the closed position.

In another aspect, the invention includes dispensers for dispensing a liquid from the cartridge. The dispensers each include an actuating coil into which the dispensing tube of the concentrate/extract cartridge is inserted. A controller is connected to the electromagnet for controlling the actuation of the piston/valve assembly located in the dispensing tube of the concentrate/extract cartridge. In one preferred embodiment, the dispenser dispenses a fluid into a delivery housing which includes a diluent receiving opening and a mixed concentrate/extract-diluent dispensing opening. In another aspect, the dispensing housing includes a diluent inlet and a diluent outlet and an opening into which the dispensing tube of the concentrate/extract cartridge delivers the concentrate/extract such that it is mixed with the stream of diluent as it is carried through the housing for downstream distribution. In the third embodiment of the invention, the dispensing housing includes a direct dispensing opening through which the concentrate/extract of the cartridge is directly dispensed for use.

For appliances using the first type of delivery housing in which a diluent is mixed with the concentrate/extract for dispensing into the specific application, this arrangement finds use in direct dispensing of refrigerated substances and can be, for example, incorporated into a fluid dispenser in a refrigerator or a heated and/or cooled bottled water dispenser.

For the second type of delivery housing, in which the concentrate/extract is dispensed into a fluid stream of diluent at a point upstream of the delivery point for the fluid, applications include delivery of detergents, fabric softeners and other treatments in washing machines, dishwashers, spray guns, irrigation and sprinkler systems, pond and pool water handling systems, and drink mixing systems.

For the third type of delivery housing wherein liquid is dispensed from the cartridge directly for use, applications include a paint color/pigment dispenser, a pharmaceutical dispenser as well as a bulk pharmaceutical to home pharmaceutical dispensing system which provides for controlled dispensing of medication.

The invention is not limited to the specific applications noted, and can be used in other systems for dispensing liquid products.

BRIEF DESCRIPTION OF THE DRAWING(S)

The preferred embodiments of the present invention are described below with reference to the drawing figures where like numerals represent like elements throughout.

FIGS. 11-15 are views of a baby formula dispenser using the first type of dispenser arrangement shown in FIG. 7.

FIGS. 16-21 are views of a bottled water dispenser that incorporates the first type of dispensing arrangement shown in FIG. 7.

FIGS. 32-36 show the second type of dispensing system of FIG. 24 integrated into a spray gun.

FIGS. 43-48 show the second type of fluid dispensing system of FIG. 24 in a drink mixer system.

FIGS. 51-57 show a paint color/pigment dispenser in accordance with the third type of dispensing system shown in FIG. 50.

FIGS. 58-63 show a pharmaceutical dispenser utilizing a third type of dispensing system shown in FIG. 50.

DETAILED DESCRIPTION OF THE PREFERRED EMBODIMENT(S)

Figure 1:
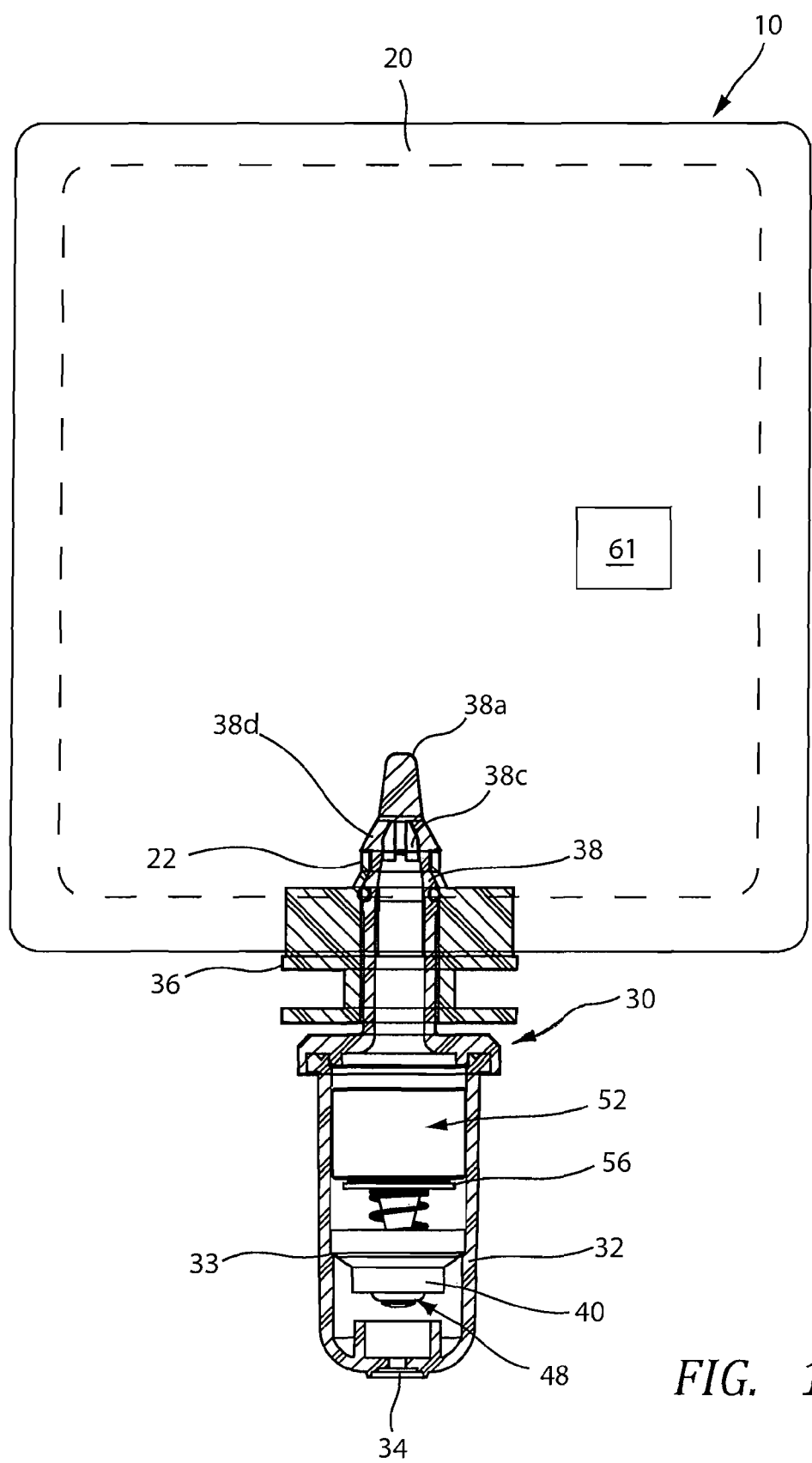
FIG. 1 is an elevational view, partially in section of an improved concentrate/extract cartridge in accordance with the present invention.

Certain terminology is used in the following description for convenience only and is not considered limiting. Words such as "front", "back", "top" and "bottom" designate directions in the drawings to which reference is made. This terminology includes the words specifically noted above, derivatives thereof and words of similar import. Additionally, the terms "a" and "one" are defined as including one or more of the referenced item unless specifically noted. The phrase "at least one" followed by a list of two or more items, such as A, B, or C, means any individual one of A, B or C as well as any combination thereof. Additionally, while the term "concentrate/extract" has been used to describe liquid dispensed by the cartridge and dispenser system according to the invention, as use herein, "concentrate/extract" is intended to refer to any liquid that is dispensed from the cartridge, and is not limited to any specific type of concentrate or extract.

The preferred embodiments of the present invention are described below with reference to the drawing figures where like numerals represent like elements throughout.

Generally, the invention relates to a dispensing system having three specific dispenser arrangements and an improved concentrate/extract cartridge that is used in connection with the three types of dispensing systems. The cartridge/system combinations can be used to dispense controlled amounts of viscous fluids either alone or in combination with a diluent, and can be used to dispense the concentrate/diluent mix either directly or through a further delivery system to the point of use or consumption. The dispensing system can be incorporated into a multitude of different dispensing devices, although specific embodiments are provided for refrigerator dispensers, water coolers, baby formula dispenser, washing machines, dishwashers, spray guns, irrigation systems and pond/pool maintenance systems, automated mixed drink machines, paint or pigment dispensers and pharmaceutical dispensing systems. These dispensing systems can be used with the concentrate/extract cartridge of the present invention or with other types of electromagnetically actuated cartridges, such as those described in the assignees prior U.S. Patent applications as well as others.

The improved concentrate/extract cartridge 10 is described first below, followed by a description of the three types of dispensing systems and various applications thereof.

Referring to FIGS. 1-4, a concentrate/extract cartridge 10 with a pump device 30 connected to a concentrate/extract container 20 for use in a dispenser according to the present invention is shown. The pump device 30 preferably includes a dispensing tube 32, having an exit orifice 34. A top flange 36 is preferably attached to an end of the dispensing tube 32, and a male locking connector 38 is attached to the top flange 36. Depending on the specific arrangement, the dispensing tube 32 can be formed in one piece or a plurality of pieces that are connected together. Preferably, the pieces are made of a suitable polymeric material.

Figure 2:
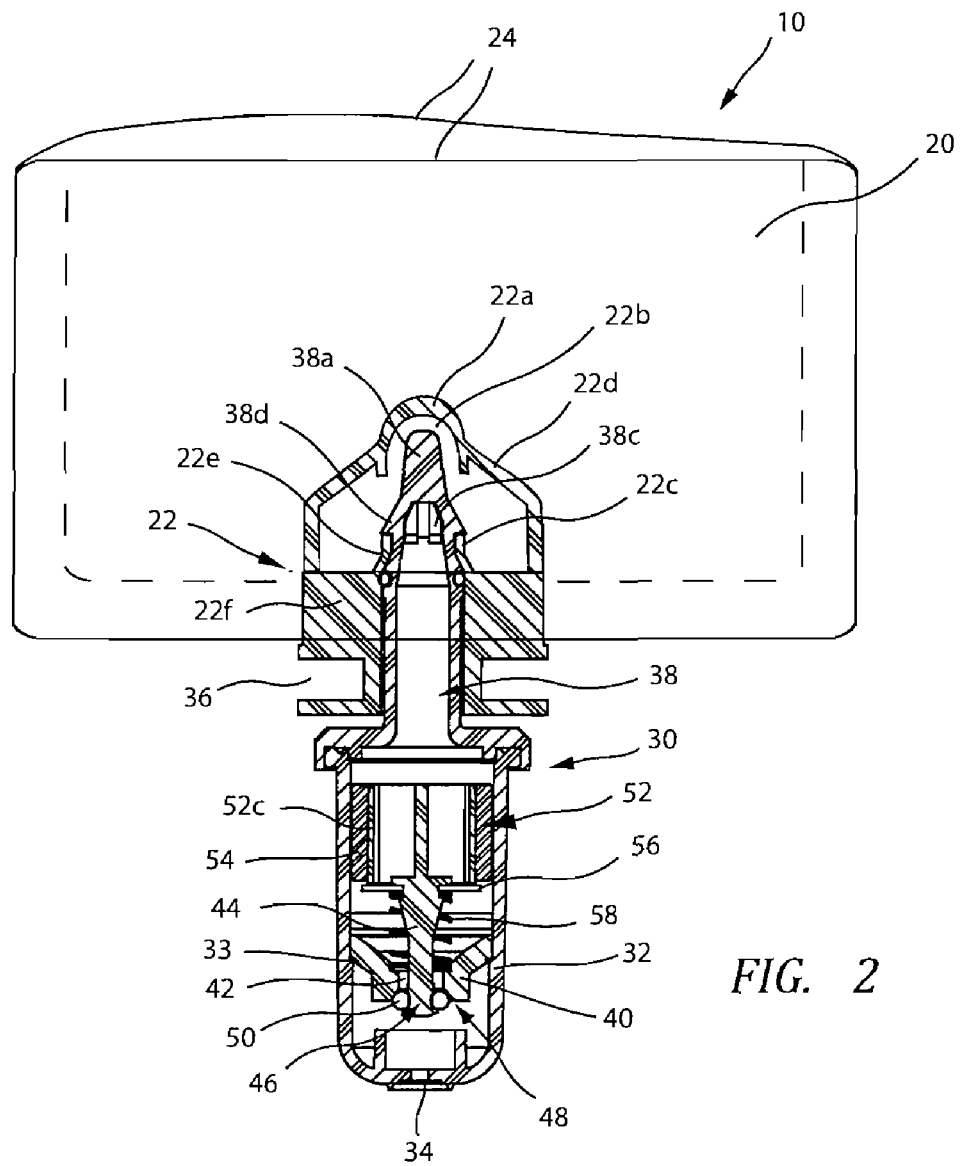
FIG. 2 is an enlarged elevational view, partially in cross section of the concentrate/extract cartridge of FIG. 1.
Figures 3, 3A:
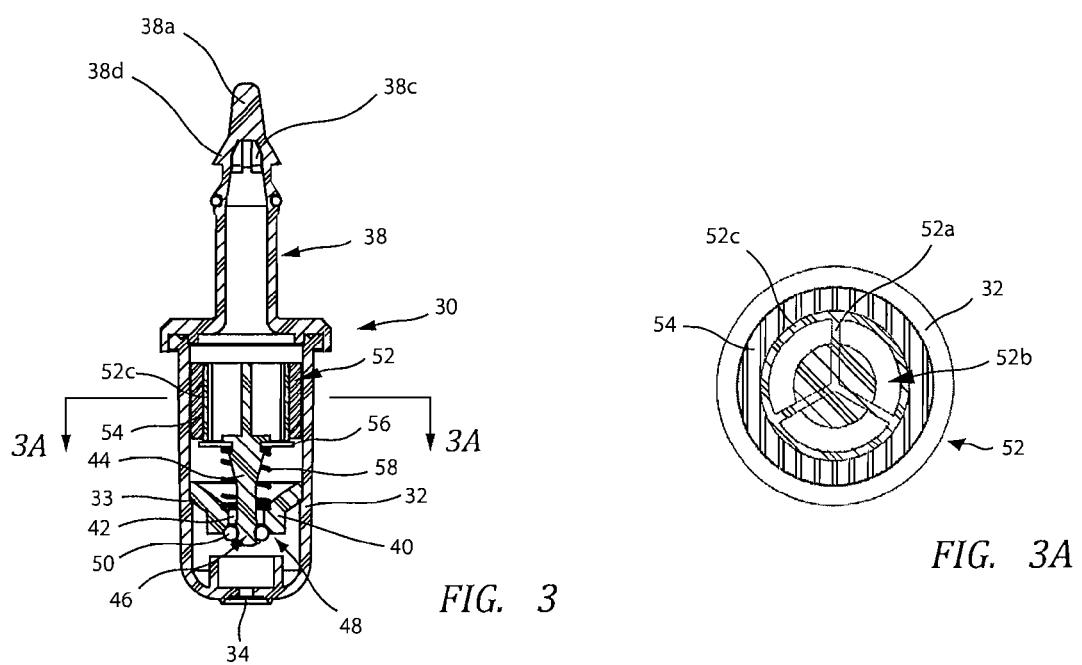
FIG. 3 is an enlarged cross-sectional view of the concentrate/extract cartridge of FIG. 1.
Figure 4:
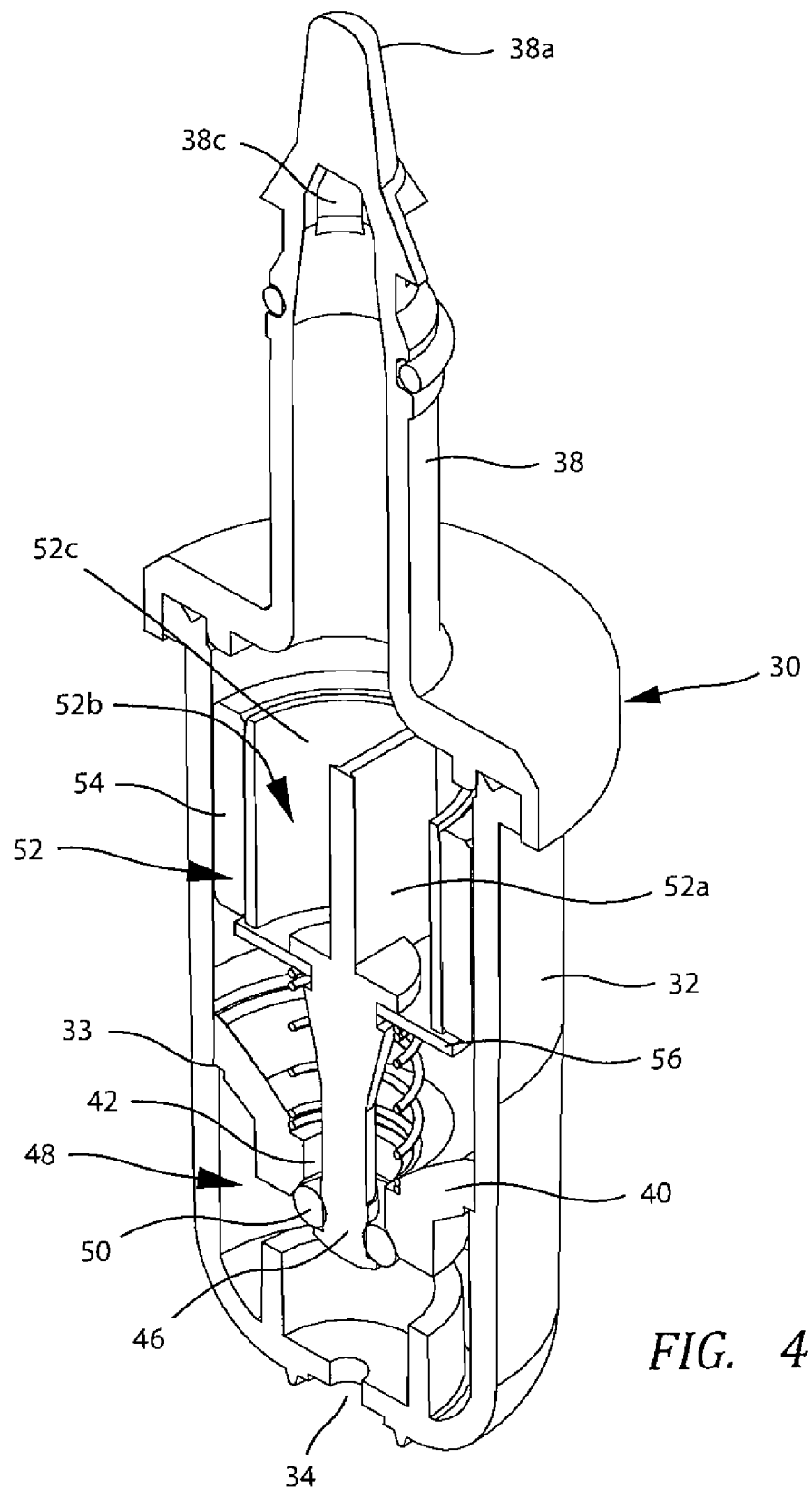
FIG. 4 is a perspective, cross-sectional view of the concentrate/extract cartridge of FIG. 1.

Details of the pump device 30 are illustrated in FIGS. 2-4. The male locking connector 38 preferably includes a conical head 38a and cross passages 38c. The locking connector 38 is connectable to a female mating connector 22 attached to the container 20. The female mating connector 22 includes a plug 22a with a cavity 22b. The plug 22a is preferably removably or frangibly connected to a seat 22c located at an end of a bore 22e in a body 22f. Flexible arms 22d connect the plug 22a to the body 22f. In use, the male connector 38 is inserted into the bore 22e of the female connector 22 such that the conical head 38a of the male connector 38 enters the cavity 22b of the plug 22a. By inserting the male connector 38, the plug 22a is disconnected from the seat 22c allowing concentrate/extract 12 to flow from the container 20, past flexible arms 22d, through the cross passages 38c, through the body of the connector 38 and into the dispensing tube 32. Barbs 38d on the male connector 38 engage behind the end of the bore 22e to retain the pump 30 to the container 20. Alternatively, the conical head 38a can be omitted and an opening provided, which would eliminate the need for the plug 22a and arms 22d.

The pump device 30 includes a valve seat 40 connected to the dispensing tube 32 within a space defined by an interior surface of the dispensing tube 32. Preferably, a shoulder 33 is defined in the dispensing tube and acts as a positive stop for assembly of the valve seat 40. The valve seat 40 includes a port 42 for passing a flow of the fluid concentrate/extract 12 through the dispensing tube 32. A valve stem 44 is connected to, and preferably integrally formed with, a valve body 46 forming a valve 48 for alternately covering and uncovering the port 42 in the valve seat 40. The valve body 46 includes an o-ring 50 to provide a seal when the valve body 46 is in contact with the valve seat 40.

The valve seat 40 is preferably frusto-conical in shape so that the contact area with the o-ring 50 is limited to a ring-shaped contact path having a small width, of preferably 0.5 mm or less, and more preferably 0.2 mm or less. This limits any potential adherence of the o-ring 50 to the valve seat 42 when the concentrate/extract cartridge 10 is not in use for prolonged periods. By providing precise positioning of the valve seat 40 along with the small ring-shaped contact region of the seal area, more precise control of dispensing volumes can be obtained.

A piston 52 is connected to the valve stem 44 opposite the valve body 46. The piston 52 is in slideable contact with or slightly spaced apart from the interior surface of the dispensing tube 32 for forcing concentrate/extract 12 through the port 42. The piston 52 comprises webs 52a, and the voids 52b between the webs 52a permit passing of a flow of the liquid concentrate/extract 12. An integral ring 52c is located at the periphery of the webs 52a to provide a mounting platform for a ferromagnetic sleeve 54, and also to act as a sealing surface for a membrane check valve formed by the membrane 56 as described below. A spring 58 is disposed between an expanded portion of the valve stem 44 adjacent to the piston 52 and the valve seat 40 to maintain the valve body 46 in contact with the valve seat 40 and prevent a flow of fluid through the valve port 42.

The piston 52 further includes the membrane 56 positioned above an upper end of the spring 58, which is at least one of moveable and/or flexible to permit a flow of fluid into the dispensing tube 32 when the valve body 46 is moving into contact with or in contact with the valve seat 40 and, conversely, to forcibly express fluid from the dispensing tube 32 through the orifice 34 when the piston 52 is actuated (i.e., when the valve body 46 is moving away from contact with the valve seat 40) such that the webs 52a and ring 52c drive the membrane 56 downwardly.

As shown in FIGS. 3 and 4, in a preferred embodiment the spring 58 presses the center portion of the membrane 56 against the fins 52a of the piston 52 and the circumferential periphery of the membrane 56 flexes up and down with movement of the piston 52 between open and closed positions, and in particular, flexes to a closed position against the ring 52c as the piston 52 is actuated and moves downwardly. Alternatively, there may be a space between the spring 58 and the membrane 56.

Upon actuation, an electromagnetic force generated by an electromagnet in the dispensing system (described in further detail below) acting on the ferromagnetic sleeve 54 of the piston 52 drives the piston 52 downwardly so that the membrane 56 is pressed against the bottom of the ring 52c for a specific controlled volume pumping action. By having the membrane 56 seal against the ring 52c of the piston on the down stroke, a more precise volume of fluid is displaced by the piston 52 on each stroke. This allows a more consistent and repeatable control of the volume of fluid being dispensed from the cartridge 10 using the dispensers of the invention. Additionally, this creates a consistent vacuum draw to pull more of the concentrate/extract from the container 20 into the area above the membrane 56.

In one particularly preferred embodiment of the cartridge 10, the dispensing tube 32 has an inside diameter of about 12 mm, and the piston 52 has a generally corresponding outside diameter, allowing for a sliding fit. The piston stroke is about 3-4 mm and the exit orifice is in the range of 1 to 3 mm (0.04 to 0.12 inches), and preferably about 1.5 mm in diameter. This results in a discharge of 0.05 mL per stroke of the piston. This can be adjusted by varying the size and stroke of the piston. Other sizes and dimensions can be utilized depending on the viscosity of the fluid being dispensed and the particular application.

The container 20 is preferably formed of polymeric or metallic flexible sheets of material that are joined together at the edges to form a flexible pouch, with the female connector 22 being sealed in one of the edge seams. However, other types of containers could be utilized, if desired.

Preferably, an ID 61 is provided on the cartridge 10 to indicate the type of beverage concentrate/extract 12 that is in the cartridge 10. The ID is preferably automatically recognized by a controller in a dispenser. The ID 61 on the cartridge could is preferably a radio frequency identification (RFID) tag which communicates with a dispenser having an RFID reader. Alternatively, the ID 61 on the cartridge could include a barcode or computer readable symbols readable by a barcode reader or other visual-type reader positioned in the receiving area of a dispenser. Alternatively, the ID 61 could include an alignment pin for activating one of a plurality of switches to inform the controller in a dispenser of the cartridge contents. Alternatively, one or more functional components, for example the pump 30, can be shaped and/or sized to indicate a type of contents, the shape and/or size of the functional component being able to be sensed by a sensor in the cartridge receiving area of the dispenser.

The concentrate/extract cartridge 10 allows the dispensing of precise amounts of concentrate/extract in a consistent and reproducible manner. The cartridges 10 include inexpensive components which allow them to be disposable for many applications. The cartridges 10 can dispense a variety of viscous fluids, such coffee, tea and/or chocolate extracts or other extracts and/or flavors for hot or cold drinks, or other beverage concentrates, baby formula, fluid condiments, fluid medicine, detergents and laundry or cleaning additives, paint color pigments and endless other food and non-food products.

According to the present invention, three different types of dispensers are provided for dispensing fluid from the cartridge 10 or other similar cartridges.

Figure 5:
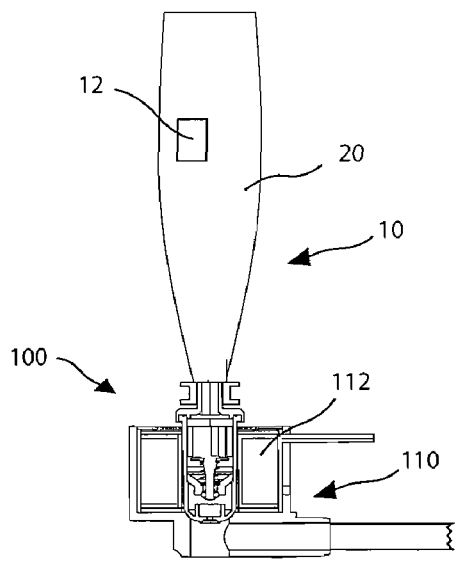
FIG. 5 is an elevational view showing a concentrate/extract cartridge arranged in a first type of dispensing arrangement housing having a diluent inlet and a mixed diluent concentrate/extract dispensing outlet.
Figure 6:
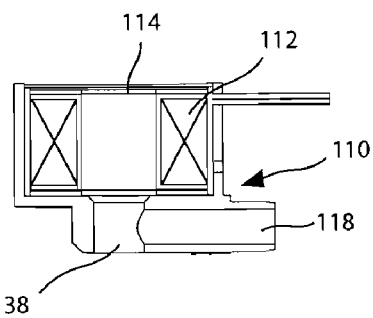
FIG. 6 is an enlarged elevational view of the housing shown in FIG. 5.
Figure 7:
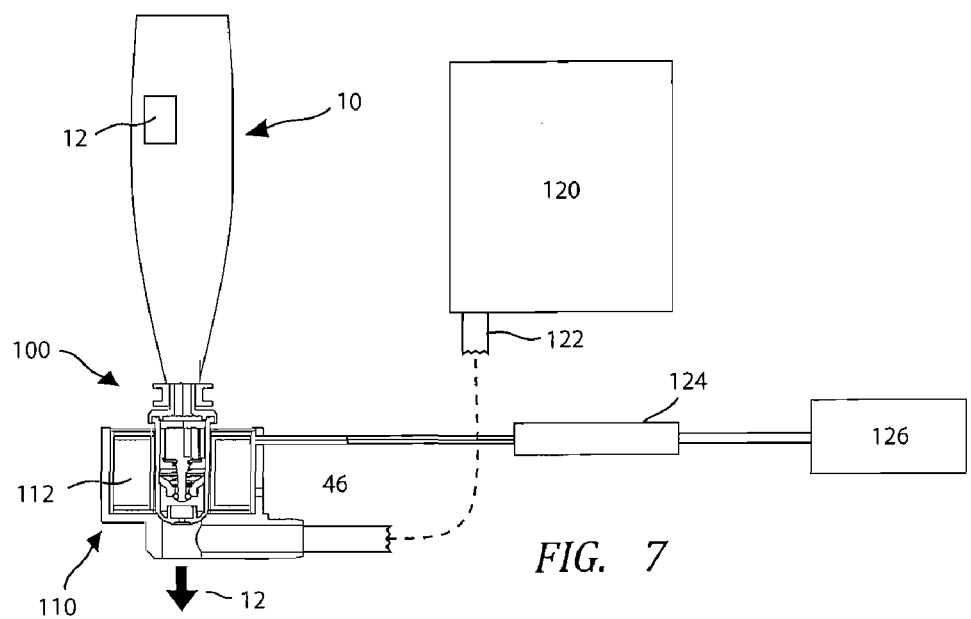
FIG. 7 is a schematic view showing the control circuit and power supply used for the first type of dispensing arrangement shown in FIG. 5.

The first type of dispenser 100 is for use in direct dispensing of a concentrate/extract from the cartridge 10 that is mixed with a diluent as it is being dispensed. This dispenser 100, shown in FIGS. 5-7, includes a dispensing housing 110 in which a wound electromagnetic actuating coil 112 is located. An opening 114 is provided in the center of the actuating coil 112 for insertion of the concentrate/extract cartridge 10, which locates the nozzle orifice 34 above and in proximity to the discharge opening 116 of the housing 110. The housing further includes a diluent receiving channel 118 which terminates in proximity to the discharge opening 116. As shown in FIG. 7, the channel 118 is connected to a diluent source 120 via a connecting tube 122. The coil 112 is connected to a controller 124 which in turn is connected to a power source 126. The controller 124 applies a voltage to the coil 112, generating an electromagnetic field, which causes the piston 52 in the cartridge 10 to be drawn downwardly in the electromagnetic coil 112. The valve body 46, which is fixed to the piston 52, follows the downward motion of the piston 52 and is displaced from the port 42 in the valve seat 40. During downward motion of the piston 52, the liquid concentrate/extract 12 located between the piston 52 and the valve seat 40 is forced through the port 42, as it is uncovered by the valve body 46 and passes out through the exit orifice 34 and into the stream of diluent traveling through the channel 118 such that the diluent mixed with the concentrate/extract 12 from the cartridge 10 is discharged from the discharge opening 116. At the same time, fluid concentrate/extract 12 from the container 20 is drawn into the area above the membrane 56 of the piston 52 in the dispensing tube 32. As described above, preferably the container 20 is collapsible and collapses to facilitate extraction of the fluid concentrate/extract 12 from the container 20, preventing the ingress of air into the container 20.

When the controller 124 cuts off voltage to the actuator 112, the spring 58 causes the piston 52 to move upwardly away from the valve seat 40. During upward motion of the piston 52, the fluid concentrate/extract flows from the area above the piston 52 through the spaces 52b and the gap between the membrane 56 and the bottom of the ring 52c into the area between the piston 52 and the valve seat 40. A voltage, such as the preferred 24 volts direct current, or other suitable AC or DC voltage, is cycled on and off to provide an intermittent current for repeating this process continuously until a desired amount of liquid concentrate/extract 12 is dispensed from the cartridge 10. The housing 110 along with the controller 124 can be integrated into a number of different appliances for mixing a concentrate/extract 12 with a diluent as it is dispensed.

Figure 10:
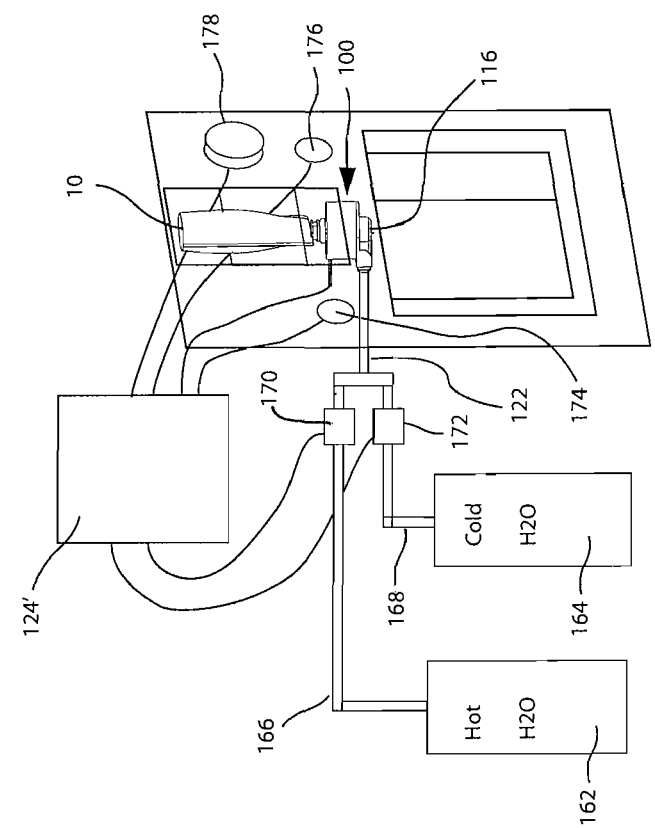
FIG. 10 is a schematic view showing the control circuitry for operating the refrigerator dispenser of FIGS. 8 and 9.
Figure 9:
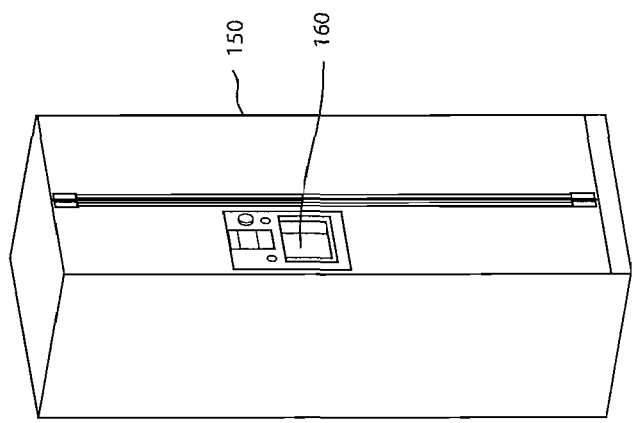
FIGS. 8 and 9 are elevational and perspective views of a refrigerator which includes the first type of dispensing system shown in FIG. 7.
Figure 8:
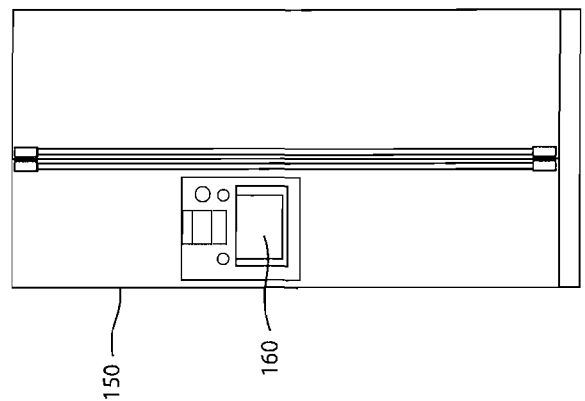

Referring to FIGS. 8-10, a refrigerator 150 in which the dispensing system 100 has been incorporated is shown. Referring in particular to FIG. 10, the dispensing system 100 is integrated into a hot and cold water dispenser located in the front of the refrigerator 150, with the dispensing opening 116 of the housing 110 being arranged to dispense the liquid concentrate extract-diluent mixture into a dispensing area 160. As shown in detail in FIG. 10, preferably sources of hot and cold water 162, 164 are connected via tubing 166, 168 and valves 170, 172 to the diluent feed tube 122. The valves 170, 172 are controlled via the controller 124'. Preferably hot and cold dispensing actuator buttons 174, 176 are provided in the front panel above refrigerator dispensing area 160. The dispensing actuator buttons 174, 176 are connected to the controller 124'. The controller 124' is either a PLC or other type of control circuit which selectively opens the valve 170 or 172, depending upon whether the hot or cold button is depressed, so that hot or cold water is fed via the respective tubing 166, 168 to the in feed tube 122 of the dispensing system 100, while at the same time power is provided to the actuating coil 112 so that a concentrate/extract from the cartridge 10 is mixed with the hot or cold water as it is dispensed from the dispensing opening 116 into a cup or other receptacle placed in the dispensing area 160. Preferably, a control is provided for selecting a desired concentrate strength, indicated as button 178 on the control panel in order to allow a user to select a desired concentrate/extract to diluent mixing ratio for a particular beverage or flavor being dispensed.

In the preferred embodiment, the cartridge 10 can include a beverage concentrate, such as a sports drink, fruit flavored drink, tea, coffee, hot chocolate or other consumable beverage flavor that is mixed hot or cold water as the diluent. Optionally, the controller 124' could include a temperate control for the hot water and/or cold water source 162, 164, respectively.

Referring to FIGS. 11-15, a baby formula dispenser 200 is shown. The dispenser 200 preferably includes a fixed housing 210 and a slidable dispensing housing 220 in which the dispensing system 100 is located. The sliding portion of the housing 220 is movable between an upper position as shown in FIGS. 11 and 12 and a lowered position as shown in FIGS. 13 and 15. Preferably, a pair of guide channels are located in the sides of the sliding portion of the housing 220, which guide mating projections extending from the fixed housing portion 210. As shown in the detailed side elevational view of FIG. 14, the dispensing housing 110 of the dispensing system 100 is located in the moveable housing 220, with the dispensing opening 116 facing downwardly. The controller 124" as well as the power supply 126 are located in the fixed portion of the housing 210. Preferably, a diluent reservoir 214 is also located in the fixed portion of the housing and is connected via a flexible tube 216 to the inlet channel 118 of the housing 110. Thus the fluid connection is maintained regardless of whether the moveable portion of the housing 220 is in the upper, operating position or the lower stowed position. Preferably, a heater is provided in the water reservoir 214 or as a separate heater tube 218 located between the reservoir 214 and the flexible tube 216. Preferably, controls 226 are provided for allowing a user to control dispensing of a concentrated baby formula. The controls 226 are connected to the controller 124", which is similar to the controller 124, 124' above. The controls 226 are preferably provided for controlling a temperature of the water fed from the reservoir 214 to the dispenser housing 110 as well as for the amount of concentrate dispensed from the cartridge 10 into the stream of water as it is mixed in the housing 110 and dispensed into a container or baby bottle held below the dispensing opening 116.

Preferably, the top of the movable housing 220 can be opened for removal and insertion of replacement cartridges 10.

Referring to FIGS. 16-21, a bottled water dispenser 250 utilizing the concentrate/extract dispensing system 100 is shown. The bottled water dispenser 250 includes a housing 260 which is adapted to receive a water bottle 270. As shown in FIGS. 18-21, the dispensing system 100 is connected into one water cooler dispensing tube 262 so that water from the water bottle 270 passing through the dispensing tube 262 can have the concentrate/extract from the cartridge 10 mixed with the water as it is being dispensed. Preferably, the dispenser 250 includes a heated reservoir 272 and a cold water reservoir 274 hot and cold control valves 276, 278, shown in FIG. 21, are also provided. Preferably, the control valves 276, 278 are controlled via a controller 124''' in order to dispense hot and/or cold water at a desired temperature as set by a user using a control panel 252, shown in FIG. 16. Thus, depending upon the user's selected setting, the dispenser 250 can dispense hot water, cold water or a mixture thereof with or without the concentrate/extract from the cartridge 10 being injected into the fluid as it is dispensed from the dispensing opening 116 from the housing 110.

Referring to FIG. 20, it is also possible to provide a storage compartment 276 in the front of the dispenser housing 260. A refrigeration compressor 280 is also shown in FIG. 20 for use in connection with the cold water reservoir 264. However, this can be omitted depending on the particular application.

Figure 22:
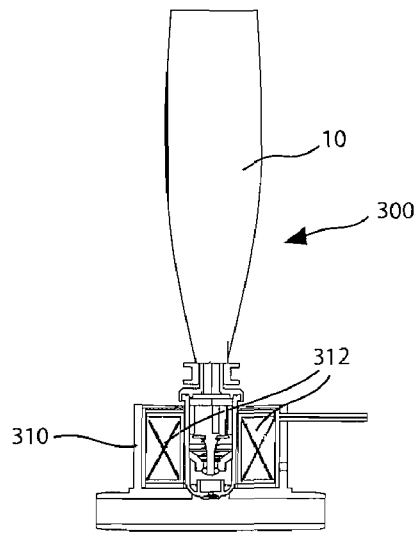
FIG. 22 is an elevational view of a second type of dispenser system in accordance with the present invention having a concentrate/extract cartridge inserted into dispenser housing having a fluid inlet, a concentrate/extract delivery inlet and a fluid outlet which is located upstream of the mixed fluid delivery location.
Figure 23:
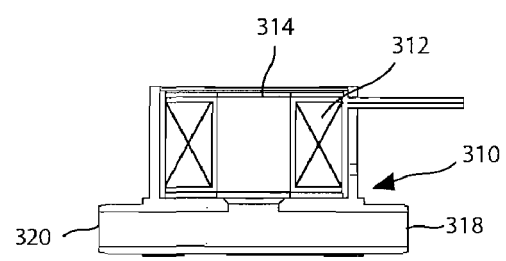
FIG. 23 is an enlarged view of the dispensing housing shown in FIG. 22.
Figure 24:
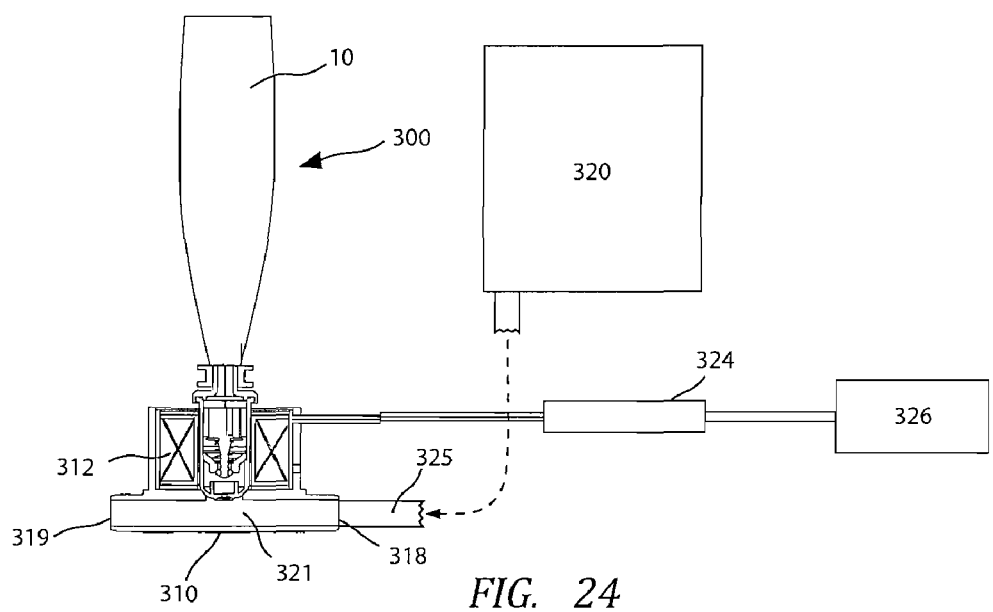
FIG. 24 is a schematic view showing the second type of dispensing system of FIG. 22 with the control circuitry.
Figure 25:
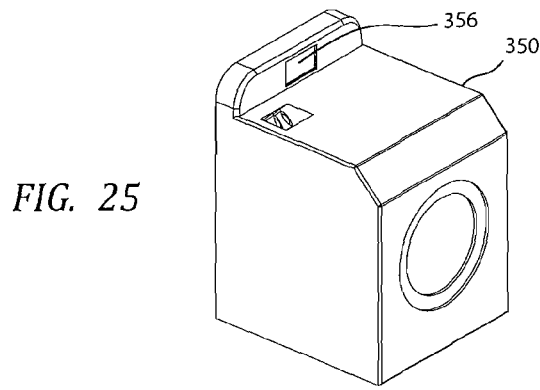
FIGS. 25-28 show the second type of dispensing system of FIG. 24 utilized in a washing machine to dispense multiple types of additives and/or detergents.
Figure 26:
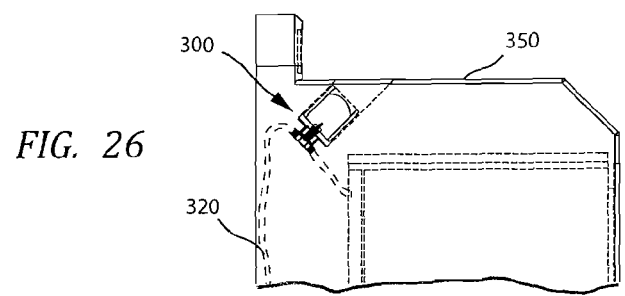
Figure 27:
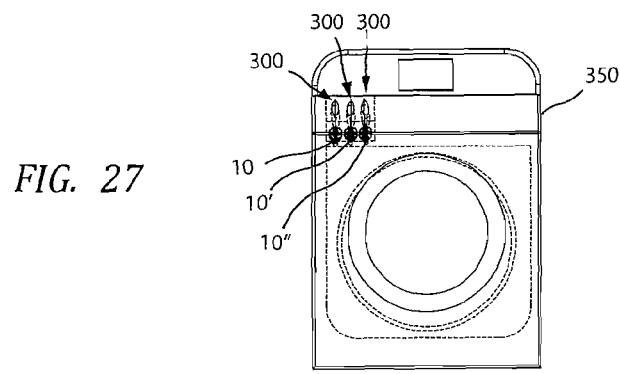
Figure 28:
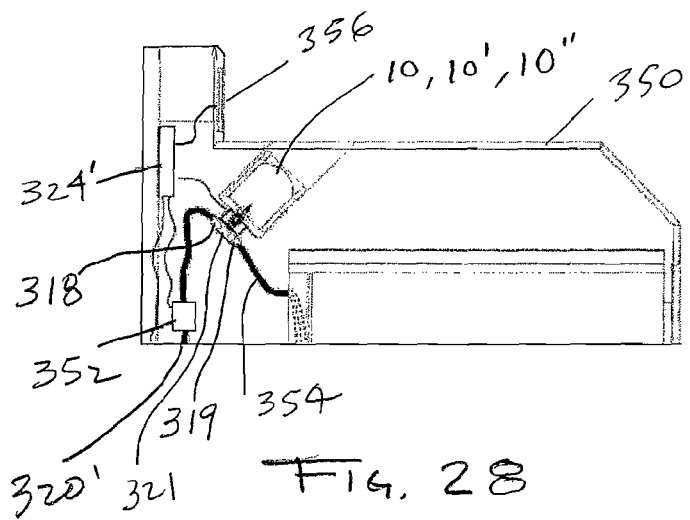

Referring to FIGS. 22-24, a second type of dispensing system 300 in accordance with the present invention is shown. The second type of dispensing system 300 is similar to the first type of dispensing system 100 as described above except that the dispensing housing 310 includes an inlet opening 318 and an outlet opening 319 with a channel 321 defined therebetween into which the orifice 34 of the cartridge 10 dispenses the concentrate or extract where it is mixed with the diluent for further downstream distribution. In contrast to the system 100 where the concentrate/extract 12 is mixed with the diluent as it is dispensed, here the mixing takes place entirely in the channel 321.

The actuating coil 312, which is similar to the coil 112, and includes an opening 314 for receiving the pump 30, is controlled via a controller 324 which is provided with power from a power supply 326. Diluent is provided from a diluent supply 320 which can be a pressurized water source, water tank or other type of water or diluent delivery system. The water supply 320 is connected to the inlet opening 318 via a tube 325.

Referring now to FIGS. 25-28, a washing machine 350 using the dispensing system 300 in accordance with the second preferred embodiment is shown. The washing machine 350 preferably includes three separate dispensing systems 300 each of which is connected to a water supply 320' and feeds into a water feed line 354 for the washer. Each of the three separate systems 300 includes a separate concentrate/extract cartridge 10, 10', 10" which can feed a different concentrate/extract into the water feed line 354 which is mixed with the water from the water supply 320'. One or more control valves 352 can be used in order to control the water flowing into the washing machine 350. The controller 324' preferably also controls actuation of the dispenser 300 depending upon whether or not a specific concentrate/extract, such as a detergent, bleach or a fabric softener is required based on user input to the controller 324 from the control panel 356, or based on a specific time in a selected wash cycle. Preferably, a user can program which if any of the specific concentrate/extract cartridges 10, 10', 10" are to be activated and dispensed using the dispensing systems 300 integrated into the washing machine 350 in connection with a given load of laundry. Amounts, concentrations and delivery times can be set via user input to the controller 324' through the control panel 356. Then, during the proper time of the washing cycle, the electromagnetic actuators 312 can be activated for the proper cartridge 10, 10', 10" in order to deliver the required concentrate into the stream of water that is directed into the washing tub.

While three dispensers 300 have been illustrated in connection with the washing machine 350, those skilled in the art will recognize that more or fewer dispensers 300 could be utilized. Additionally, while it is believed to be more practical to use the system 300 for dispensing the concentrate/extracts into the washing machine 350, it is also possible to use the system 100, described above or possibly the system for direct injection of concentrates/extracts 500 as described below.

Figures 29, 30:
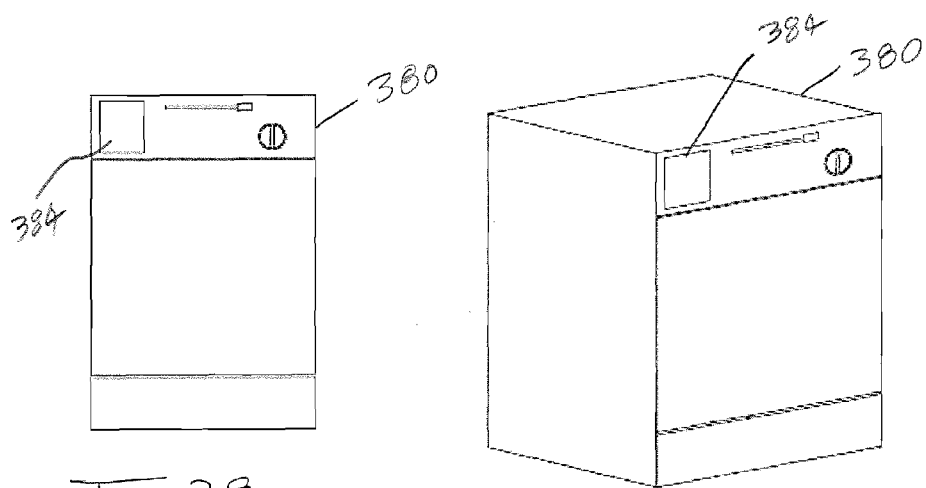
FIGS. 29-31 show the second type of dispensing system of FIG. 24 for dispensing additives in a dishwasher.
Figure 31:
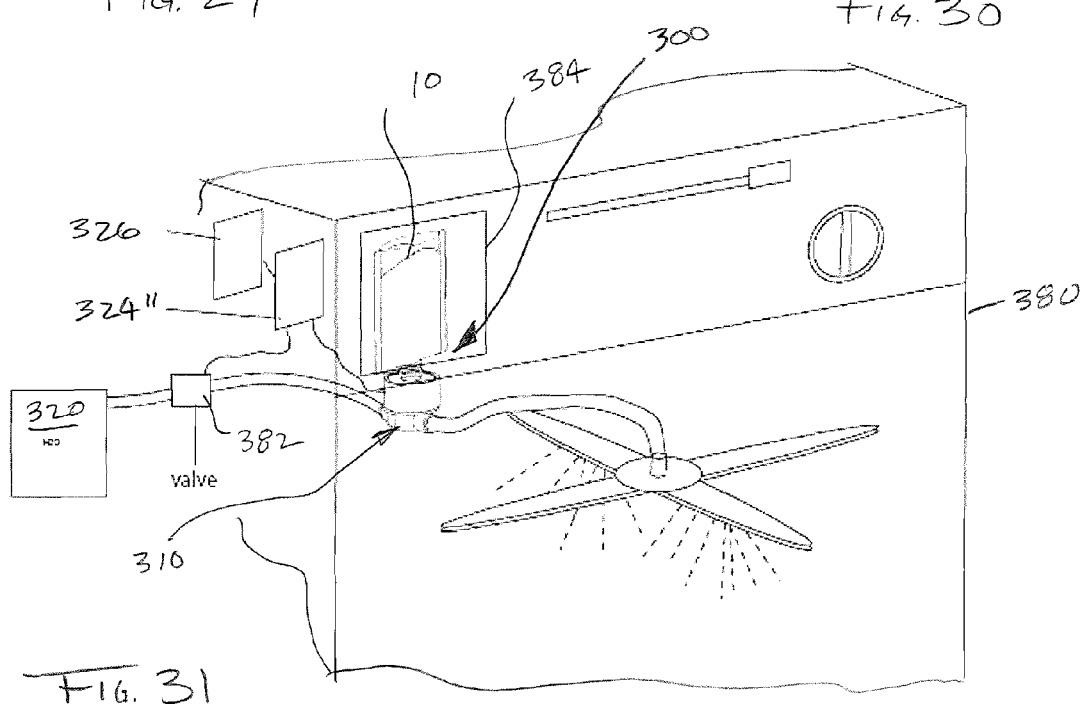
Figure 36:
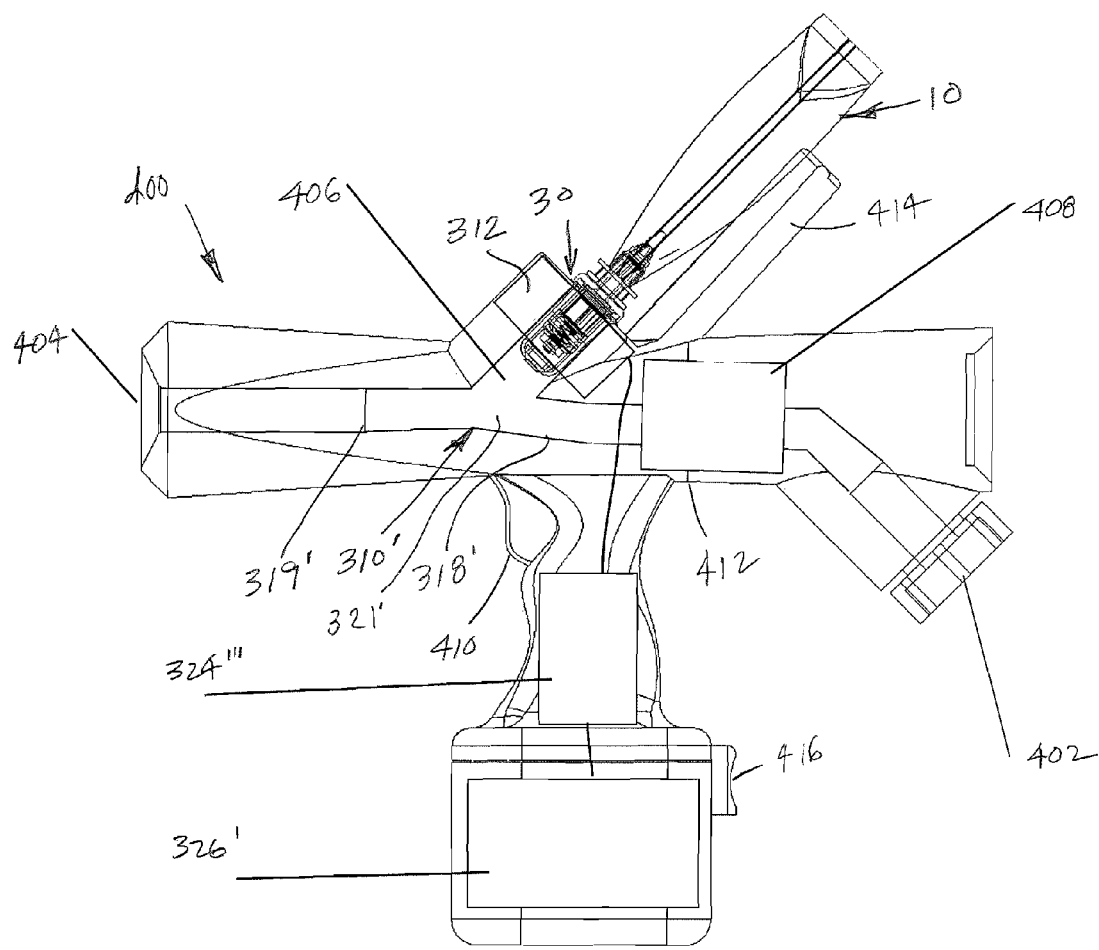

Referring to FIGS. 29-31, a dishwasher 380 using the dispensing system 300 in accordance with the present invention is shown. The dishwasher 380 incorporates the dispensing housing 310, which is built into the dishwasher 380, and includes an access panel 384 in order to allow user access for inserting a cartridge 10. In a manner similar to the washing machine 350 noted above, a power supply 326 provides power to the actuating coil 312 located within the housing 310 via a control 324" at a pre-determined time during the dish washing cycle, which can be selected by a user using a control panel (not shown) on the front of the dishwasher 380 that controls the dishwashing operations. In this manner dishwashing detergent can be dispensed from the cartridge 10 directly into the water that is used for washing dishes using the dispensing system 300 along with concentrate/extract cartridges 10 having the appropriate dishwashing detergent.

Referring to FIGS. 32-36, a spray gun 400 in which the dispensing system 300 is integrated is shown. Preferably, the spray gun includes a connector 402, such as for connection to a garden hose, which is the diluent input and is connected to the inlet opening 318' of the dispensing housing 310'. The output opening 319' is directed to a nozzle output 404. The actuating coil 312 includes the opening 314 into which the pump 30 of the cartridge 10 is inserted. The output of the cartridge 10 is directed via a channel 406 into the flow of liquid in the channel 321' between the inlet opening 318' and the outlet opening 319' inside the mixing housing 310'. A control valve 408 is preferably provided for flow of the diluent through the tubing from the input 402. Preferably, a control circuit 324''' is connected to the actuating coil 312 and is controlled via a user input, such as through a trigger switch 410. For the spray gun 400, preferably the power supply 326' is in the form of a battery pack which is preferably a rechargeable nickel metal hydride or NiCad battery suitable for operating the actuating coil 312 via the control 324'''.

As shown, the cartridge 10 is resting on a support 414 which extends from the housing 412. Those skilled in the art will recognize that the spray gun housing 412 could include an enclosed cartridge loading area with a cover, if desired in order to secure the cartridge 10 in position.

The battery is preferably removable using a latch system 416, which is of the type generally known in the art of battery powered tools, such as power drills, and is therefore not described in further detail.

In use, the spray gun 400 can be used for applying fertilizers to plants or for the application of lawn chemicals or insecticides. Alternatively, it can be used for power washing applications, such as for applying detergent during washing of a car or for cleaning spills on driveways, decks or patios. Thus, the spray gun 400 has versatility for a multitude of uses simply by exchanging cartridges 10, and should not be considered as limited to the exemplary uses specifically noted above.

Figure 37:
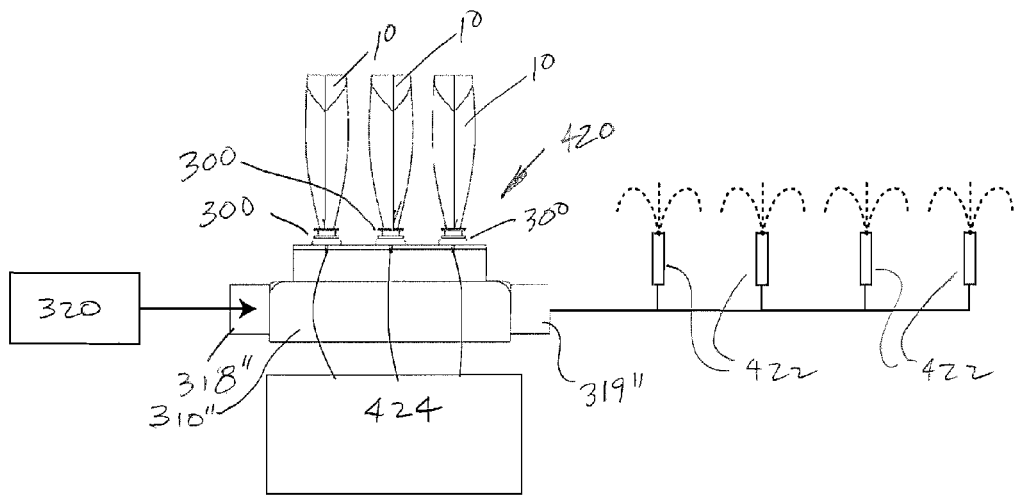
FIGS. 37-39 show the second type of fluid dispensing system of FIG. 24 integrated into an irrigation or sprinkler system.
Figure 38:
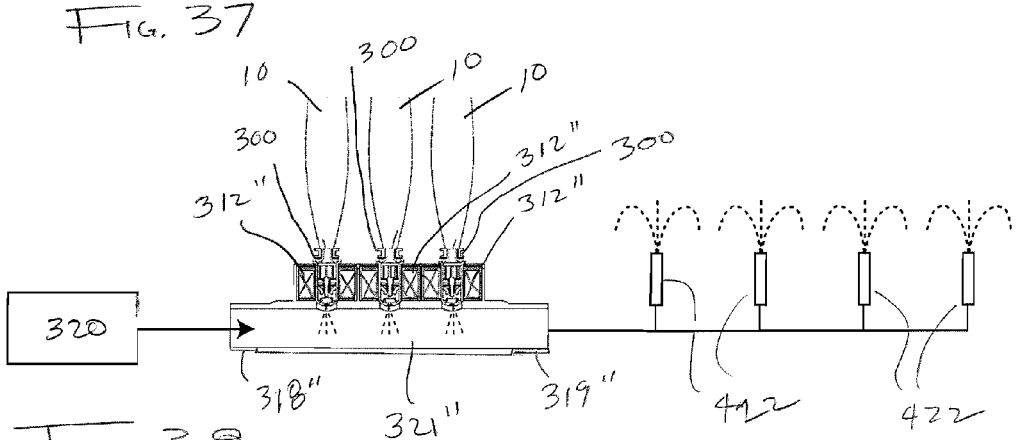
Figure 39:
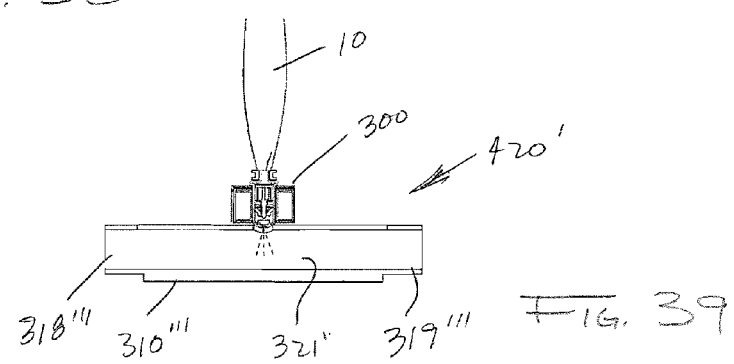

Referring to FIGS. 37-39, an irrigation sprinkler system 420 using one or more dispensing systems 300 in order to apply lawn chemicals contained in concentrate/extract cartridges 10 through sprinkler heads 422 is shown. As shown in FIGS. 37 and 38, the dispensing housing 310" can be arranged to support three separate actuating coils 312" and includes three openings into the channel 321" between the inlet 318" and the outlet opening 319" so that the liquid concentrate/extract from the cartridges 10 is mixed with the flow of water from the supply 320 prior to exiting the sprinkler heads 422. The controller 424, which is similar to the controller 324 above, is connected to a power supply which can be separate or integrated with the controller 424, and includes timing circuits and/or circuits for controlling which of the desired concentrate/extract cartridges 10 is actuated via powering the actuating coils 312" separately from one another. Alternately, all three actuating coils 312" can be actuated at the same time through the controller 424 if higher concentrations of the same additive delivered from different cartridges 10 is desired, or if different additives are provided by the different cartridges 10. As used herein, "additive" is synonymous with concentrate/extract, and either term can be used to describe a liquid being dispensed from the cartridge 10, or other similar cartridges.

FIG. 39 shows a similar embodiment of the irrigation sprinkler system 420' in which the dispensing housing 310''' includes only a single opening, in effect providing an enlarged version of the housing 310 shown in FIG. 22 for inline dispensing of additives into a stream of water flowing in the channel 321''' between the inlet 318''' and the outlet 319'''.

The illustrated embodiments allow for the addition of lawn chemicals or additives into a sprinkler system, which can be controlled via a user control panel (not shown) attached to the control 424 that can for instance, allow a user to program in set times when the sprinkler system, in addition to watering the lawn or other plants, adds specific additives or chemicals into the water being distributed through the sprinkler heads 422.

Figure 40:
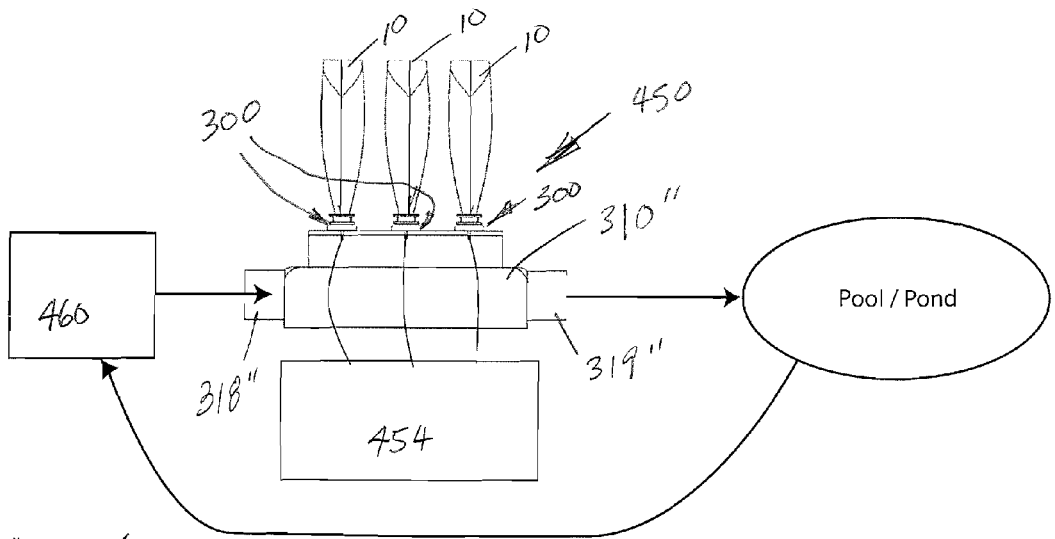
FIGS. 40-42 show the second type of fluid dispensing system of FIG. 24 integrated into a pool or pond additive system.
Figure 41:
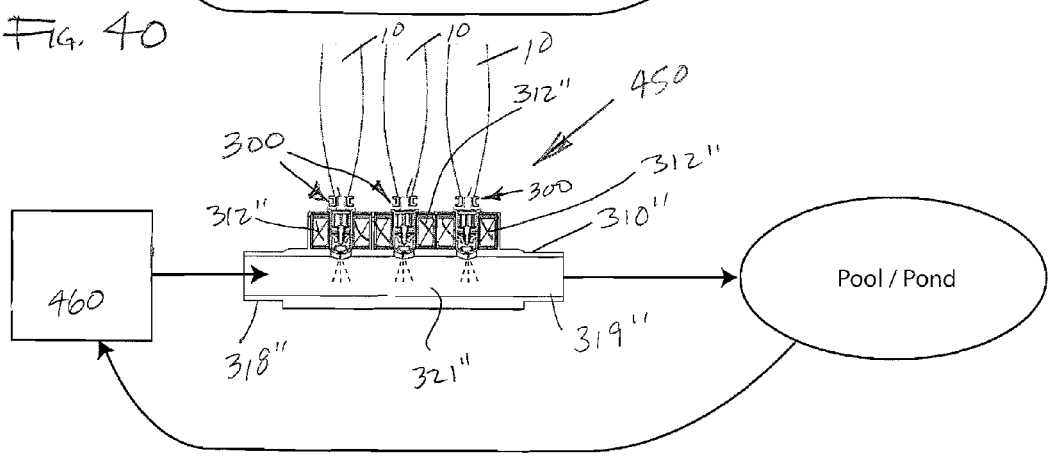
Figure 42:
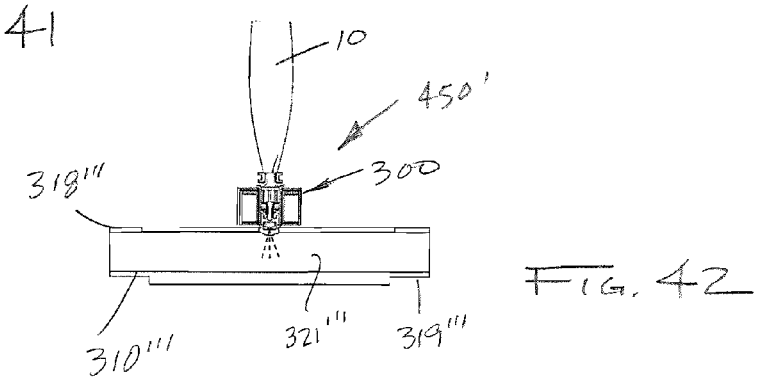
Figure 47:
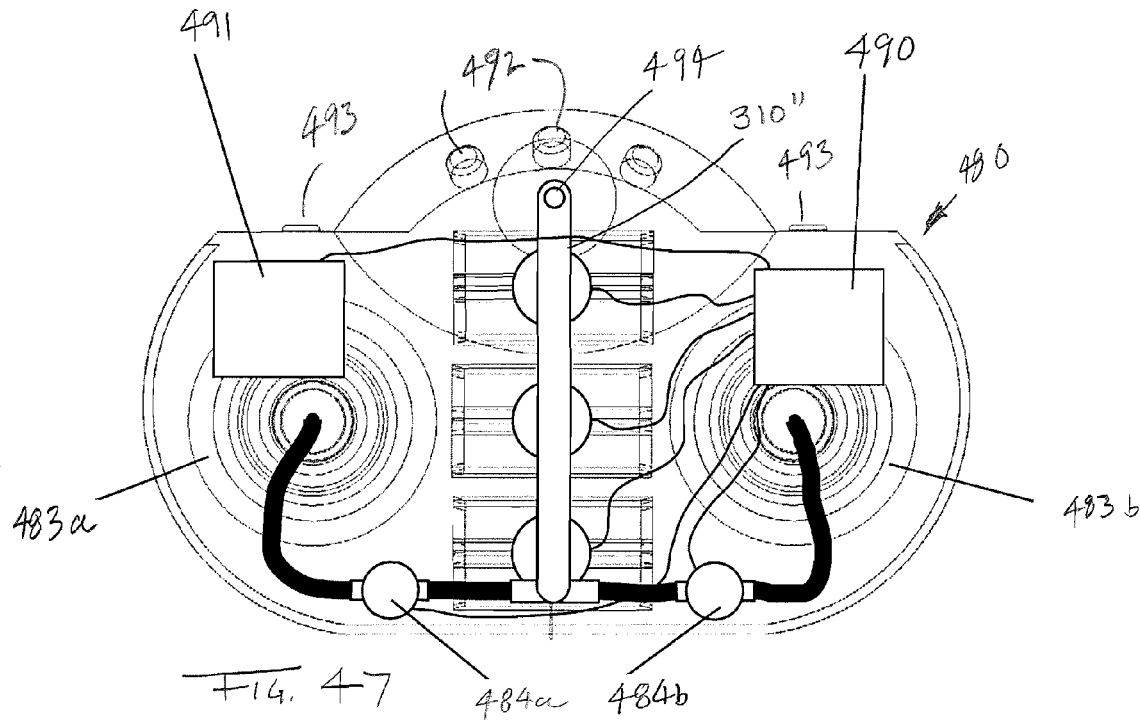
Figure 48:
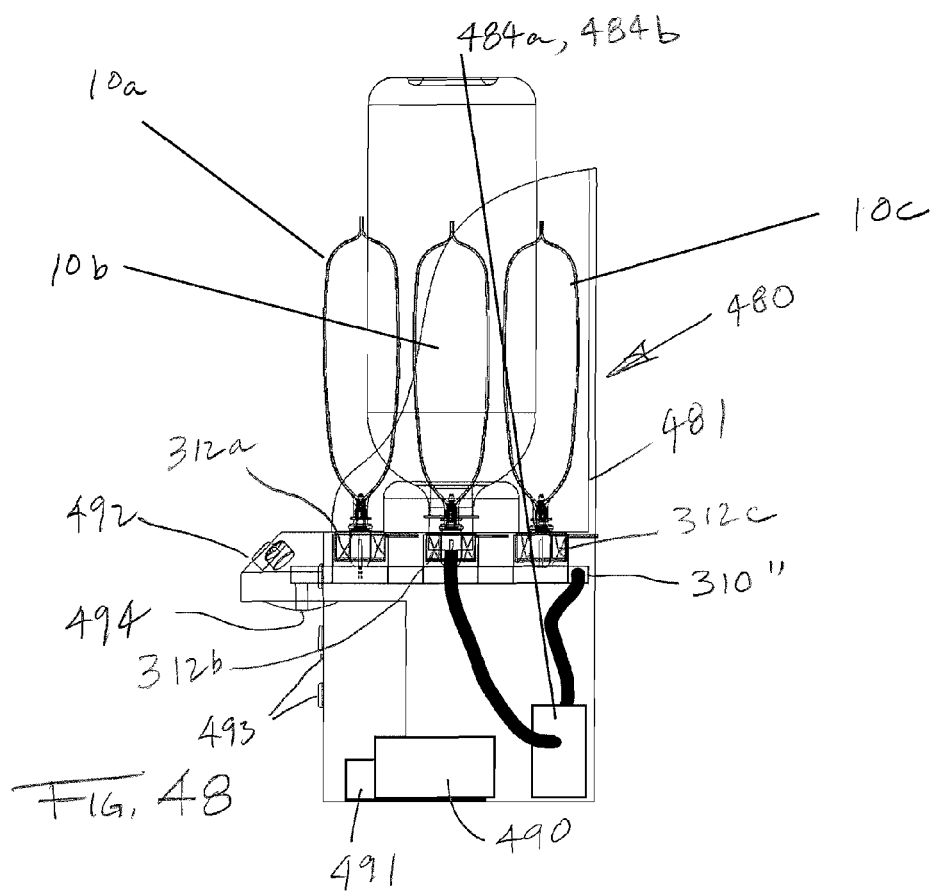

Referring now to FIGS. 40-42, a pool/pond system additive device 450 which includes the dispensing system 300 is shown. The pool/pond additive system 450 is the same as the irrigation sprinkler system 420, except that the water is supplied via a circulation pump 460 to the inlet 318" of the dispensing housing 310". The controller 454, which is similar to the controller 324 shown in FIG. 24 or the controller 424, controls the actuating coils 312" in order to dispense additives/chemicals to a pool or pond in a user programmable manner, which is preferably entered via a control panel or input system for the controller 454. The additives or chemicals can be dispersed on a timed basis, or the controller can be connected to a sensor system in the pool or pond and add the required amounts of various chemicals or additives as required, for example to balance pH, to add chlorine and/or to add an algaecide. While FIGS. 40 and 41 show the pool/pond system 450 with three separate dispensing systems 300, it is possible to use more or less, with one or more pool or pond additives or chemicals being dispensed. For example, in the system 450' shown in FIG. 41, only a single dispensing system 300 is utilized in connection with the dispensing housing 310'''.

Referring now to FIGS. 44-48, a drink mixer 480 utilizing the dispensing system 300 in accordance with the present invention is shown. The drink mixer 480 includes a housing 481 having receptacles 482a, 482b for receiving bottles of a diluent 483a, 483b. Each receptacle 482a, 482b is connected via tubing to a pump 484a, 484b, shown in FIG. 47, which delivers the selected diluent to a mixing housing 486, which is similar to the housing 310" described above in that it has provisions for three of the dispensing systems 300 to dispense a concentrate/extract into the mixing housing 310" as the diluent from either the first or second supply bottle 483a, 483b is being dispensed. As shown in detail in FIGS. 47 and 48, three actuating coils 312a, 312b, 312c are provided and are each connected to a controller 490 for selectively actuating one or more of the coils 312a, 312b, 312c to dispense a concentrate/extract from any one of the cartridges 10a, 10b, 10c shown. The selected diluent delivered via pump 484a or 484b then mixes inside the mixing housing 310" with the concentrate or extract for the particular drink selected. The user utilizes a control panel 492 which is in communication with the controller 490 to select the desired drink, which is then dispensed via the dispensing opening 494 into a container or cup placed below the dispensing opening 494. A separate power supply 491 can be provided or the power supply can be integrated into the controller 490. In the preferred embodiment, the bottles 483a, 483b hold a mixer such as seltzer water or soda and the concentrate/extract cartridges 10a, 10b, 10c include a concentrate or liquor of a desired type commonly used in making mixed drinks. The concentration of the concentrate/extract to mixer can preferably be adjusted via the user using the control panel 492 in order to have the desired actuating coil 312a, 312b, 312c activated at a higher or lower frequency so that more or less of the concentrate/extract is dispersed from the respective pumps 30 of the concentrate/extract cartridges 10a, 10b, 10c into the diluent being carried through the mixing housing 310". While a preferred arrangement of the drink mixer 480 is illustrated, those skilled in the art will recognize that more or less dispensing systems can be integrated into the drink mixer 480 by adjusting the size of the mixing housing to accommodate more or less dispensing systems 300 so that a greater or lesser variety of concentrate/extract cartridges 10a, 10b, 10c, . . . can be utilized at the same time. Button 493 located on the face of the dispenser housing can be used to adjust the concentration of the extracts being delivered and/or to adjust the flow rate of the pumps 484a, 484b which deliver the diluent to the mixing housing 310".

In a preferred embodiment, the drink mixer 480 is used for making mixed alcoholic drinks. The diluents can be either alcoholic or non-alcoholic and the concentrate/extract provided in the cartridges 10a, 10b, 10c could also be alcoholic or non-alcoholic, depending upon the type of drink being mixed. In addition or alternatively, the drink mixer 480 can be used to mix various types of flavored non-alcoholic drinks.

Figure 49:
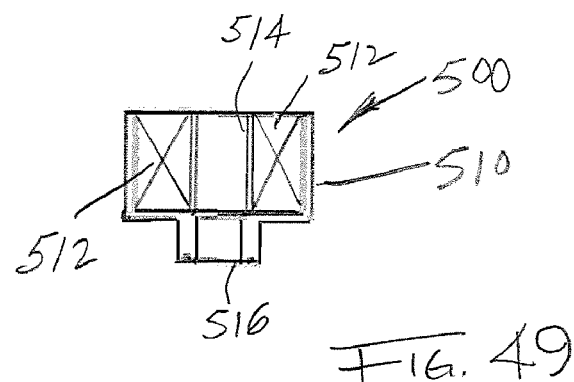
FIG. 49 shows a dispenser housing for direct dispensing of a concentrate/extract in accordance with a third type of dispensing system according to the invention.
Figure 50:
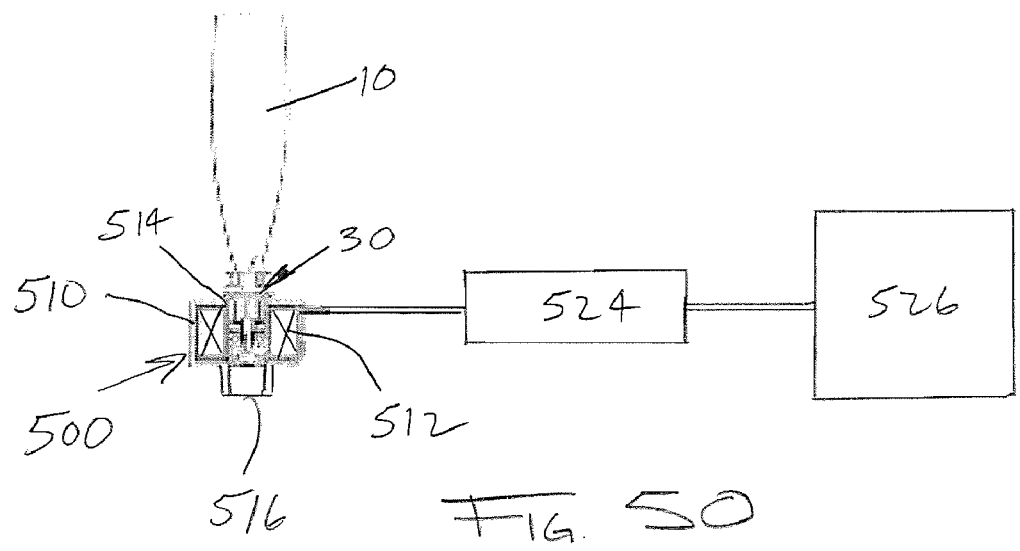
FIG. 50 is a schematic diagram of the third type of dispensing system with the concentrate/extract cartridge located in the dispensing housing shown in FIG. 49.

Referring now to FIGS. 49 and 50, a third type of dispensing system 500 in accordance with the present invention for dispensing a concentrate/extract from a cartridge 10 or other cartridge is shown. The third dispensing system 500 includes a dispensing housing 510 in which an actuating coil 512 is located. An opening 514 is provided for receiving the pump 30 of the concentrate/extract cartridge 10. A direct dispensing opening 516 is provided at the bottom of the housing 510. As shown in FIG. 50, preferably the actuating coil 512 is connected to a controller 524, which can be a PLC or other known controller similar to those described above, which receives power from a power supply 526. In use, the concentrate/extract cartridge 10 is placed with the pump 30 in the opening 514 of the dispensing housing 510. A user signals the controller 524 via a control panel (not shown) which can be a key pad or button for actuation, which results in the controller 524 providing intermittent power to the actuating coil 512 such that the concentrate/extract from the cartridge 10 is dispensed through the dispensing opening 516 into a container or other vessel.

This third type of dispensing system 500 is used for direct, controlled dispensing of the concentrate/extract or other material from the cartridge 10 in a precise and repeatable manner.

Figure 57:
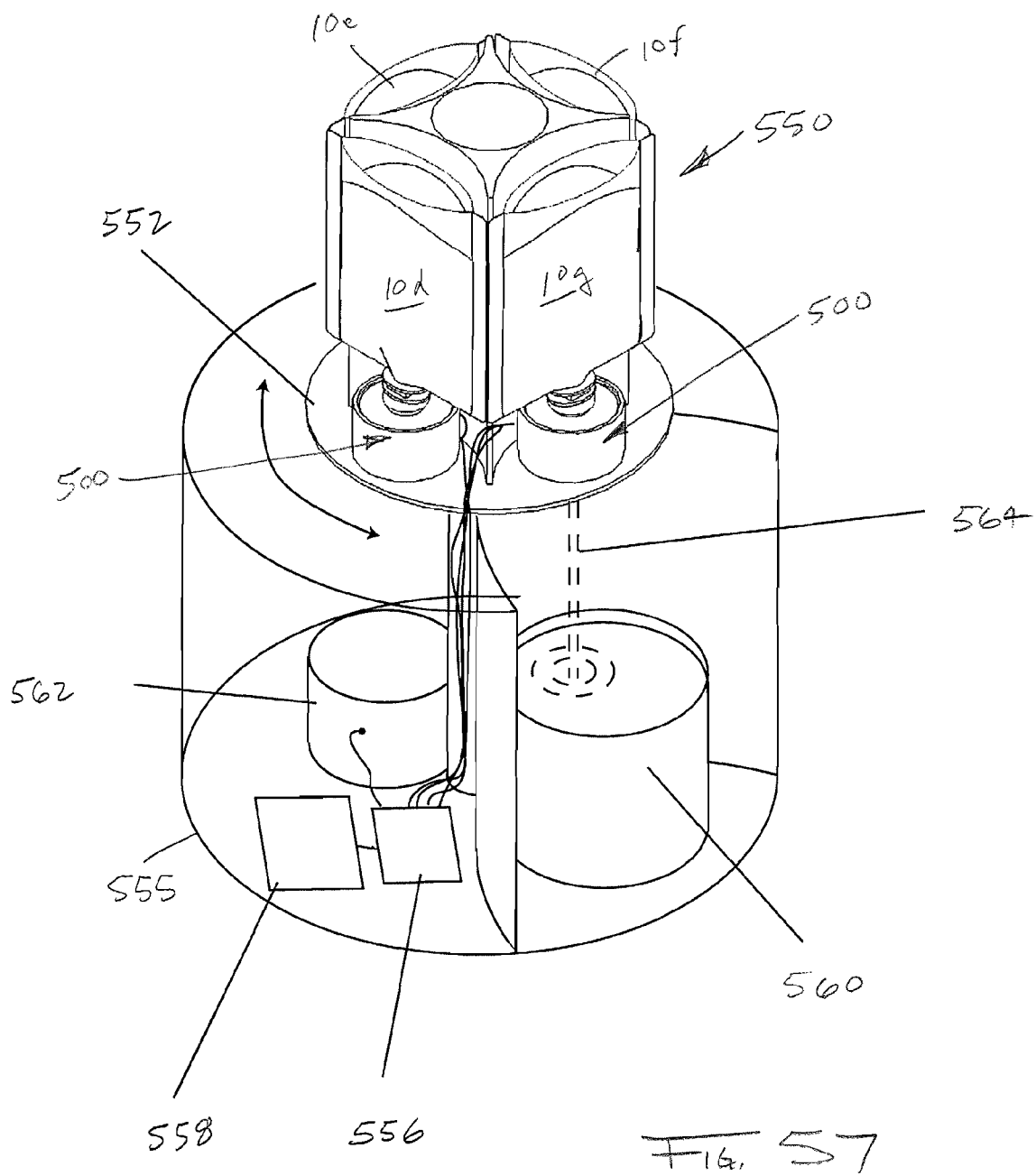
Figure 62:
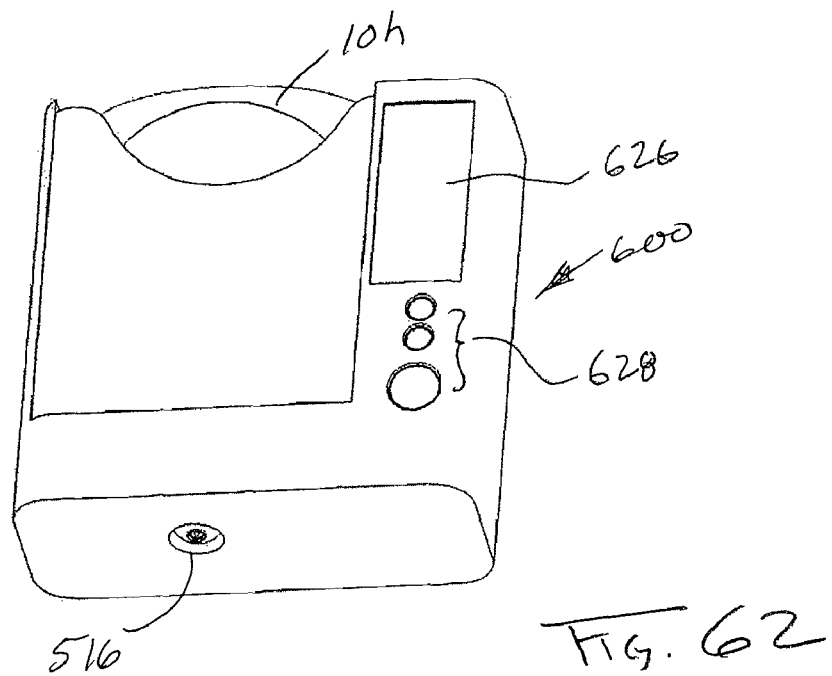

Referring to FIGS. 51-57, a paint color or pigment dispenser 550 is shown. The paint color/pigment dispenser includes four of the third type of dispensing systems 500 mounted on a carousel 552 with a cartridge 10d, 10e, 10f, 10g located in each of the dispensing housing 510 located on a carousel 552. As shown in FIG. 54, the dispensing openings 516 extend through the carousel 552. Preferably, as shown at FIGS. 55 and 56, an outer wall 554 is provided that extends upwardly from the carousel 552 in order to hold the cartridges 10d, 10e, 10f, 10g in position in the dispensing house 510. Referring to FIG. 57, the carousel 554 for the paint color/pigment dispenser 550 is shown mounted on top of a mixing stand 555, also shown is the controller 556 which is connected to the actuating coils 512 of the dispensing systems 500 mounted on the carousel 552. A power supply 558 preferably supplies power to the controller 556. Preferably, a user inner face control panel is provided (not shown) which allows a user to select pre-programmed pigment dispensing recipes or to input a desired pigment mix into the controller 556 so that the different pigments contained in cartridges 10d, 10e, 10f, and 10g can be dispensed in the precise desired amounts into a container 560 for mixing a custom or desired color of paint. The paint container with the added pigment is then mixed by shaking in the known manner.

The controller 524 preferably also controls a motor 562 which rotates the carousel 552 so that each of the required pigments is indexed into the proper dispensing position for dispensing the pigment or color into the container 560. The pigment being dispensed from cartridge 10g is indicated at 564 as being delivered into the container 560. While the preferred embodiment only utilizes four of the direct dispensing systems 500 mounted on the carousel 552, those skilled in the art will recognize that a greater or fewer number of the dispensing systems could be utilized. While the disclosed embodiment is preferably used for paint color or pigment mixing, those skilled in the art will recognize that there could be other uses, for example, such as dispensing desired amounts of liquid flavoring or ingredients used in baking or other operations.

Referring now to FIGS. 58-63, a pharmaceutical dispensing device 600 is shown. The pharmaceutical dispensing device 600 includes a third type of dispenser 500 for directly dispensing pharmaceuticals from a cartridge 10h having its pump 30 inserted into the dispensing housing 510 of the dispensing system 500. The dispensing housing 510 is mounted in the housing 602 of the pharmaceutical dispensing device 600. A controller 624 is located in the pharmaceutical dispensing device 600 and is connected to the control panel 626 and user input buttons or switches 628 as well as to the actuating coil 512 of the dispensing system 500. The correct dosage of product can then be delivered from the dispensing opening 516 into another container which can be for example a cup or drink which the patient uses to take the medicine, or a container for storage of a predetermined amount of the pharmaceutical being dispensed from the cartridge 10h.

In one preferred embodiment, the cartridge 10h includes an RFID tag 15h which is positioned in proximity to an RFID tag reader 630 located in the housing 602 of the pharmaceutical dispensing device 600. The RFID tag reader 630 is also connected to the controller 624 and allows the dispenser 600 to verify the type of pharmaceutical being dispensed from the cartridge 10h so that it can be matched with a prescription.

In a further preferred embodiment, the controller 624 further includes a data card reader or device for attaching an external data storage device. This external data storage device can be used by a physician to electronically prescribe a required pharmaceutical. When the electronic storage device is connected to the controller 624, it then knows the specific pharmaceutical and can verify that the proper cartridge 10h has been inserted in the dispensing device 600 and can also pre-program the required dosage based on the external memory storage device being connected to the controller 624. While an RFID tag and reader system is preferred, those skilled in the art will recognize that other types of identification systems can be utilized to verify that the proper cartridge 10h containing the desired pharmaceutical is inserted in the dispenser 600, for example a bar code and reader. The controller 624 can further interface with an online electronic database for electronic transfer of prescriptions from a physician to a pharmacy through the internet or other data transfer system.

The pharmaceutical dispensing device 600 can also be used in a patient home to dispense a required amount of pharmaceutical or drug from a cartridge 10h on a periodic basis based on a prescription. This can be done using manual user inputs, data stored on a data storage device located on the cartridge 10 which communicates with the controller 624, or using the controller 624 and an external data storage device connected to the controller 624 with the prescribed times and/or amounts of the pharmaceutical to be dispensed so that only a prescribed amount is dispensed at any given time. This can prevent accidental overdosing by a consumer of the pharmaceutical being taken. As with the use of the dispenser 600 in a pharmacy described above, the home unit can also be connected with an internet or other data transfer system for direct transfer of data from a doctor or pharmacist to a user pharmaceutical dispensing device 600 to control the amount of pharmaceutical being dispensed.

Figure 63:
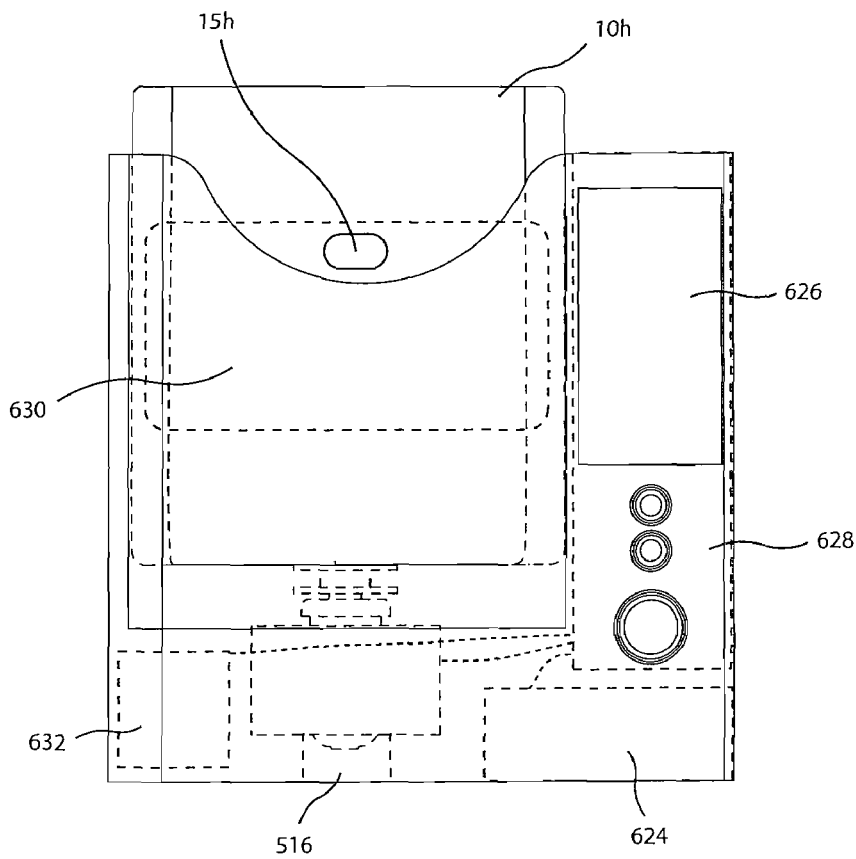

As shown in FIG. 63, it is also possible for the pharmaceutical dispensing device 600 to include a mobile communication device which operates on known cell phone technology or wireless internet technology in order to obtain data on a specific prescription, an amount to be dispensed or other required data. Such a mobile communication device is shown in FIG. 63 as 632.

Referring to FIGS. 64-68, the pharmaceutical dispensing device 600 can be used in connection with an intelligent dosing system 650.

Figure 64:
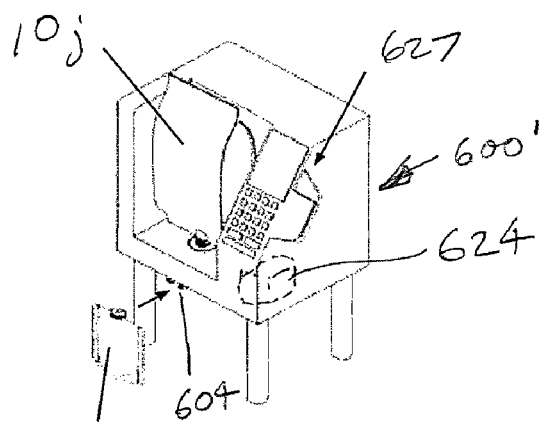
FIGS. 64-67 show a bulk dispenser system utilizing the third type of dispenser shown in FIG. 50 for use in combination with the home medical dispenser system shown in FIGS. 58-63.
Figure 65:
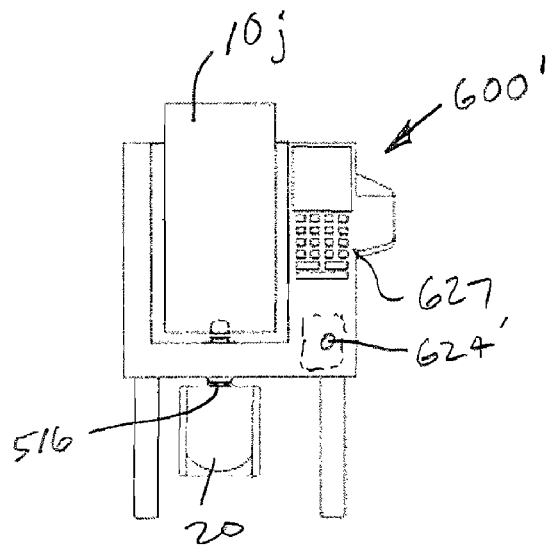

FIG. 64, a first pharmaceutical dispensing device 600', which is similar to the pharmaceutical dispensing device 600 described above, is shown. The dispensing device 600' is a bulk dispenser for example for use in a pharmacy that includes a user input keypad 627 as well as a card reader which can read, for example, prescription cards which include saved information regarding a specific prescription, including the pharmaceutical required, the frequency of dosage as well as the dosage strength. The controller 624' can receive information from the card via the card reader or can receive information by having it typed in through the keyboard. A cartridge 10j, which is the same as the cartridge 10 described above, however, much greater in size so it can store a large quantity of product, is located in the dispenser 600', and a container 20 which can be used to assemble the cartridge 10, as shown in FIGS. 1-4 and described above, is connected to the dispensing opening 516 so that the container 20 can be filled with a prescribed amount of the pharmaceutical delivered from the cartridge 10j via the dispensing system 600'. As shown in FIG. 65, the container 20 is filled with the desired amount of the pharmaceutical from the cartridge 10j. The pump assembly 30 is then installed such that the finished cartridge 10h is formed, which is the same as cartridge 10 shown in FIG. 1. The cartridge 10h can then be inserted into a home pharmaceutical dispensing system 600 where the exact required doses can be dispensed at the required time intervals into a cup or a container.

In one preferred application, the doctor's office issues prescriptions electronically via a secure card or other electronic transfer method, including direct transfer to the pharmacy or pharmacy database via the internet or other electronic data transfer system. The exact prescription including the required dosage is included in this data. The patient then goes to the pharmacy and gives the pharmacist the secure card or presents identification. The pharmacist, either using the card or data received from the data conveying system, uses the card or data in the filling system 600' in FIGS. 64 and 65 and inserts the correct bulk cartridge 10j into the dispenser 600'. An empty container 20 used for forming a cartridge 10 as shown in FIG. 1 is then connected into a receiver 604 which holds the opening of the container 20 in position under the dispensing opening 516. The correct amount of pharmaceutical is then dispensed into the container 20 in order to fill the prescription. Electronic data from the doctor, including the contents and dosing can then be transferred to an RFID tag or similar data storage strip located on the container 20. The pump assembly 30 is then inserted to seal the container and form the cartridge 10h, which would appear identical to the cartridge 10 shown in FIG. 1.

Preferably, the ID information from the bulk cartridge 10j is also transferred to the RFID tag on the cartridge 10h that was filled, including the date, fill amount and any ID information which can be used for future tracking purposes. This allows for traceability back to the source if there is ever an issue with the contents of the cartridge 10h.

Figure 66:
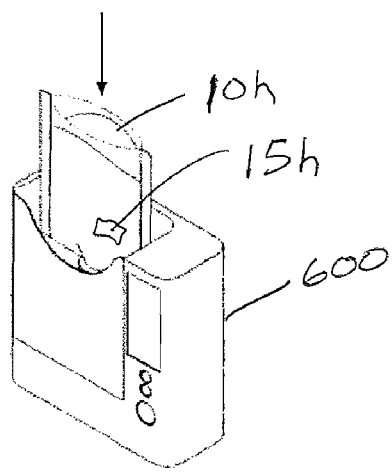
Figure 67:
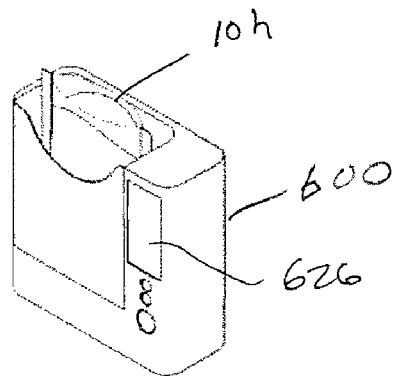

The patient then transports the cartridge 10h home where he or she may insert it into the dispenser 600, as shown in FIG. 66. This home dispenser 600 will now dispense the exactly required doses at the required intervals into a cup or container. The display associated with the control panel 626 can also indicate that the pharmaceutical needs to be dispensed into a cup of juice or water and can remind the patient to take the medications at required times via an audible alarm connected to the controller 624. Additionally, if the patient fails to take the medication, it is possible to send out an alarm to a caretaker, doctor or pharmacy via the external communication system such as that provided by the wireless communication device 632, or via other means. The cartridge 10h can also include expiration date data which is communicated to the controller 624, which will not allow the product to be dispensed if the expiration date has passed.

The controller 624 can store in a memory information regarding the amount of medicine left in a plurality of different cartridges 10, associating each of the cartridges 10 with its unique ID, so the cartridges 10 can be rotated in and out of the dispenser 600 without affecting the stored memory.

It is also possible to provide over the counter medications in the cartridges 10 which can be dispensed accurately using the dispenser 600. This allows a more precise dispensing with the ability to precisely adjust dosages depending on age, weight or any other statistic that a pharmaceutical company may wish to use to calculate the proper dose. For example, when the cartridge 10h is inserted, the controller 624 can prompt the control panel 626 to request an age, weight or other predetermined profile item that may be used to determine the correct amount of pharmaceutical to be dispensed. The controller can also prompt the user to enter information concerning the user's allergies or other drugs being taken by the user, to allow the controller to warn the user of potential side effects and adverse drug interactions. The controller preferably uses a user's personal information along with information contained by the ID to dispense an appropriate amount of medicine. Patient profiles can also include other relevant information, such as age, weight, allergies, etc., which can be used to guard against allergic reactions to certain medications.

The present system prevents or reduces the occurrences of misuse or misdosing of liquid medications due to a caregiver using the wrong dosing cup for a particular medication or misreading the directions and/or misreading the markings on a dosing cup. Any of these situations can result in the patient being given several times the recommended dosage of the pharmaceutical. Additionally, common tableware teaspoons come in a variety of sizes with some holding as little as 2.5 ml of liquid or as must as 9.5 ml of liquid while an exact measuring tea spoon holds exactly 5 ml of liquid. This invention is important for preventing overdosing, especially in the administration of acetaminophen products in pediatric medications such as cold and cough preparations. Such overdosing can result in damage to the patient and liability for the pharmaceutical company. Thus, the importance of providing an exact pharmaceutical dosing system which can dispense precise metered amounts of pharmaceuticals provides a tremendous advantage over the known system.

It is also possible to use the dosing system of FIGS. 64-67 in hospitals with the patient ID bracelet being utilized to provide patient information for filling prescriptions and/or dispensing doses of pharmaceuticals for patient consumption. To do this, a bar code reader can be attached to or interface with the controller 624.

Thus, according to the present invention, the pharmaceutical dispensing system 600 allows for information exchanged between electronic devices and packaging; provides critical patient and dosing information that can be carried along with the prescription from the doctor to the patient in the packaging; and allows for tracing of flawed products in the event of a problem. The dosages which the dosing system 600; 600' delivery are precise in both filling and dispensing.

The use of the RFID or other type of automated tracking in connection with the cartridges provides the ability to prevent improper dispensing of medicaments; mislabeling and/or allergic reactions due to patient data being compared with the pharmaceutical data for a particular product.

Preferably, dispensing systems 600, 600' can be used in conjunction with liquid medications and pharmaceuticals, including over the counter medicines such as cough syrups, cold and flu medicine, stomach medicines, liquid vitamins and liquid pain medications, it can also be used with any other controlled liquid dispensing where it is necessary to dispense controlled amounts in a precise manner.

While the preferred embodiments of the dispensers have been described for a number of uses based on the three dispenser types, 100, 300 and 500 which utilize the cartridges 10 in accordance with the invention as well as other cartridges of this type, those skilled in the art will recognize that various other changes can be made and that the cartridges and dispensers have a number of other uses which take advantage of the precise amounts of liquids that can be dispensed using the invention.

While the preferred embodiments of the invention have been described in detail above, the invention is not limited to the specific embodiments described which should be considered as merely exemplary. Further modifications and extensions of the present invention may be developed and all such modifications are deemed to be within the scope of the present invention as defined by the appended claims.

What is claimed is:

1. An appliance including a dispenser for a liquid, comprising:
 a dispensing housing with a cartridge receiving opening in the dispensing housing;
 an electromagnetic dispensing actuator located in the dispensing housing around the cartridge receiving opening;
 a concentrate/extract cartridge removably insertable into the cartridge receiving opening in a position to be actuated by the dispensing actuator, the concentrate/extract cartridge adapted to hold a fluid to be dispensed via the dispensing housing, the concentrate/extract container comprising:
 a hollow body;
 a dispensing tube connected to the hollow body;
 a piston located in the dispensing tube and comprising spaced apart internal webs with a ring connecting the webs and an external ferromagnetic material sleeve located around the external ring; and
 a valve having a valve stem that passes through a port of a valve seat connected to the dispensing tube, the port defining a flow passage through the dispensing tube, and a valve body located at a second end of the valve stem in removable contact with the valve seat, for alternately opening and closing the port the, valve stem is connected to the piston at a first end of the valve stem, the piston includes a membrane configured to permit a flow of fluid into the dispensing tube when the valve body is in contact with the valve seat and to forcibly express the fluid from the dispensing tube when the piston is moved downwardly and the valve body is moved from a contact position with the valve seat; and
 a controller located in the appliance to control the actuator to discharge concentrate/extract from the cartridge.

2. An appliance according to claim 1, wherein the membrane seals against the ring during activation of the actuator.

3. The appliance of claim 2, wherein the valve seat comprises a frusto-conical sealing surface.

4. The appliance of claim 3, wherein the valve body comprises an o-ring to provide a seal with the valve seat when the valve body is closed.

5. The appliance of claim 1, further comprising a supply line connected to at least one of a pump and a control valve for delivering a stream of diluent to the dispensing housing, and the dispensing tube of the concentrate/extract cartridge is positioned to deliver a stream of the fluid into the stream of the diluent.

6. The appliance of claim 5, wherein the dispensing housing includes a diluent receiving opening to which the supply line is connected that leads to a mixing region in proximity to a exit orifice of the dispensing tube, and the dispensing housing further includes a discharge opening extending generally axially aligned with the dispensing tube orifice.

7. The appliance of claim 6, wherein the appliance is a refrigerator or a water cooler, and the dispensing tube is directed toward a fluid outlet of the dispensing housing, the controller controls the dispensing actuator such that the fluid from the concentrate/extract cartridge is dispensed as water is dispensed from the appliance.

8. The appliance of claim 7, wherein the controller controls an amount of the fluid dispensed from the cartridge and a temperature of the dispensed mix of the fluid and water.

9. The appliance of claim 5, wherein the dispensing housing includes a diluent receiving opening to which the supply line is connected that leads to a mixing region in proximity to a exit orifice of the dispensing tube, and the dispensing housing further includes a outlet opening extending generally axially aligned with the diluent receiving opening.

10. The appliance of claim 9, wherein the appliance is selected from the group consisting of a clothes washing machine, a dish washer, an irrigation or sprinkler system, a pool or pond chemical system, a spray gun or a multi-ingredient mixed drink dispenser.

11. The appliance of claim 10, wherein the appliance is a dish washer or a washing machine, and the controller controls the washing cycle and the dispensing of a predetermined or programmable amount of fluid from the cartridge in accordance with a predetermined time in the washing cycle.

12. The appliance of claim 10, wherein there are a plurality of the electromagnetic dispensing actuators, and a separate one of the concentrate/extract cartridges is located in each of the dispensing actuators, and the controller separately controls actuation of the electromagnetic dispensing actuators to dispense predetermined or programmable amounts of different fluids from the cartridges either at the same or different times in the washing cycle.

13. The appliance of claim 10, wherein the appliance is the spray gun, and the controller and actuator are powered by a battery, and a trigger controls actuation of the electromagnetic dispensing actuator.

14. The appliance of claim 13, wherein an axis of the cartridge dispensing tube is located at an acute angle to an axis of the diluent receiving opening.

15. The appliance of claim 10, wherein the appliance is the irrigation or sprinkler system, or the pool or pond chemical system and a plurality of the electromagnetic dispensing actuators are provided, with one of the concentrate/extract cartridges being located in each of the actuators located in a common dispensing housing having a single diluent inlet opening and a single outlet opening, and the controller controls an activation time of the electromagnetic dispensing actuators.

16. The appliance of claim 10, wherein the appliance is the multi-ingredient mixed drink dispenser which includes a plurality of the electromagnetic dispensing actuators, and separate ones of the concentrate/extract cartridges with different drink ingredients are located in each of the actuators, and the controller actuates the actuators to dispense a required amount of the extracts with mixers in order to make a drink selected by a user based on a program stored in the controller.

17. The appliance of claim 1, wherein the dispensing housing includes a direct dispensing opening at a bottom of the housing, axially aligned with the cartridge receiving opening for direct discharge of liquid from the cartridge.

18. The appliance of claim 17, wherein the appliance is selected from the group consisting of a paint color pigment dispenser and a medicament dispenser.

19. The appliance of claim 18, wherein the appliance is a medicament dispenser and is controlled by the controller to dispense an amount of medicament based on a weight and or age of a user that is input into the controller.

20. The appliance of claim 18, further comprising an electronic ID tag reader located on the medicament dispenser and an electronic ID tag on the cartridge that can be read using the electronic ID tag reader, and a data reader connected to the controller that receives outside data regarding a medicament to be dispensed, nad the controller using the electronic ID tag reader to verify the ID of the cartridge located in the dispensing actuator prior to activation.

21. The appliance of claim 1, wherein an exit orifice of the dispensing tube is sized between 0.04 inch and 0.12 inch in diameter, whereby a flow of concentrate/extract exiting the dispensing tube is substantially atomized.

22. The appliance of claim 1, wherein the appliance is a baby formula dispenser, and the controller controls an amount of the fluid being dispensed from the cartridge, and a temperature of baby formula dispensed 23. The appliance of claim 1, further comprising a plurality of the electromagnetic dispensing actuators which discharge into a common mixing channel in the dispensing housing, each of the electromagnetic dispensing actuators being separately activatable by the controller, and a separate concentrate/extract cartridge being installed at each electromagnetic actuator.

24. A concentrate/extract cartridge for a fluid dispenser adapted to dispense a fluid, the cartridge comprising:
a hollow body;
a dispensing tube connected to the hollow body;
a piston slideably contained by an interior surface of the dispensing tube and comprising spaced apart internal webs with a ring connecting the webs and an external ferromagnetic material sleeve located around the external ring; and
a valve having a valve stem that passes through a port of a valve seat connected to the dispensing tube, the port defining a flow passage through the dispensing tube, the valve stem being connected to the piston at a first end of the valve stem, and a valve body located at a second end of the valve stem in removable contact with the valve seat, for alternately opening and closing the port,
the piston includes a membrane configured to permit a flow of fluid into the dispensing tube when the valve body is in contact with the valve seat and to forcibly express fluid from the dispensing tube when the piston is moved downwardly and the valve body is moved from a contact position with the valve seat.

25. The concentrate/extract cartridge of claim 24, further comprising an exit orifice at an end of the dispensing tube that is sized between 0.04 inch and 0.12 inch in diameter, whereby a flow of fluid exiting the dispensing tube is substantially atomized.

26. The concentrate/extract cartridge of claim 24, further comprising a shoulder located in the dispensing tube, and the valve seat being a separate part that is located against the shoulder.

27. The concentrate/extract cartridge of claim 24, further comprising a port flow through area, corresponding to a cross-sectional area through the port minus a cross-sectional area of the valve stem at the port that is between 2% and 4% of a flow area defined by the dispensing tube.

28. A method of dispensing a refrigerated drink from a refrigerator or water cooler, comprising:
providing a refrigerator or water cooler with a dispensing housing that opens into a drink dispensing area, the dispensing housing having a cartridge receiving opening, an electromagnetic dispensing actuator located in the dispensing housing around the cartridge receiving opening; a concentrate/extract cartridge removably insertable into the cartridge receiving opening in a position to be actuated by the dispensing actuator, the concentrate/extract cartridge adapted to hold a fluid to be dispensed into the dispensing housing, the concentrate/extract cartridge including a hollow body, a dispensing tube connected to the hollow body, a piston located in the dispensing tube, and a valve having a valve stem that passes through a port of a valve seat connected to the dispensing tube, the port defining a flow passage through the dispensing tube, and a valve body located at a second end of the valve stem in removable contact with the valve seat, for alternately opening and closing the port the valve stem is connected to the piston at a first end of the valve stem, the piston comprising spaced apart internal webs with a ring connecting the webs, an external ferromagnetic material sleeve located around the external ring and a membrane configured to permit a flow of fluid into the dispensing tube when the valve body is in contact with the valve seat and to forcibly express the fluid from the dispensing tube when the piston is moved downwardly and the valve body is moved from a contact position with the valve seat, and a controller to control the actuator to discharge concentrate/extract from the cartridge;
a user inserting a selected cartridge with a desired beverage concentrate/extract into the dispensing housing, with the dispensing tube located in the cartridge receiving opening;
pressing a button to signal the controller to activate the electromagnetic dispensing actuator;
the controller sending an intermittent current to the actuator causing the piston to reciprocate back and forth and forcibly expressing a precise measured amount of the concentrate/extract from the dispensing tube and into a stream of cold water as it is being dispensed.

29. A method of dispensing a medicament, comprising:
providing a medicament dispenser with a dispensing housing that opens into a dispensing area, the dispensing housing having a cartridge receiving opening, an electromagnetic dispensing actuator located in the dispensing housing around the cartridge receiving opening; a concentrate/extract cartridge removably insertable into the cartridge receiving opening in a position to be actuated by the dispensing actuator, the concentrate/extract cartridge adapted to hold a fluid medicament to be dispensed, the concentrate/extract cartridge including a hollow body, a dispensing tube connected to the hollow body, a piston located in the dispensing tube, and a valve having a valve stem that passes through a port of a valve seat connected to the dispensing tube, the port defining a flow passage through the dispensing tube, and a valve body located at a second end of the valve stem in removable contact with the valve seat, for alternately opening and closing the port the valve stem is connected to the piston at a first end of the valve stem, the piston comprising spaced apart internal webs with a ring connecting the webs, an external ferromagnetic material sleeve located around the external ring and a membrane configured to permit a flow of fluid into the dispensing tube when the valve body is in contact with the valve seat and to forcibly express the fluid from the dispensing tube when the piston is moved downwardly and the valve body is moved from a contact position with the valve seat, and a controller to control the actuator to discharge concentrate/extract from the cartridge;
a user inserting a selected cartridge with a desired medicament into the dispensing housing, with the dispensing tube located in the cartridge receiving opening;
pressing a button to signal the controller to activate the electromagnetic dispensing actuator;
the controller sending an intermittent current to the actuator causing the piston to reciprocate back and forth and forcibly expressing a precise measured amount of the concentrate/extract from the dispensing tube and into a stream of cold water as it is being dispensed.

30. The method of claim 29, further comprising a sensor on the medicament dispenser reading a product identification from the cartridge, and a user inputting patient information into the controller, and the controller controlling a dispensing function based on the product identification and the patient information.

31. A method of dispensing pool or pond chemicals or additives, comprising:
providing a dispensing housing that is connected into a pool or pond water feed line, the dispensing housing having at least one cartridge receiving opening with an associated electromagnetic dispensing actuator; a concentrate/extract cartridge removably insertable into each of the at least one cartridge receiving openings in a position to be actuated by the associated dispensing actuator, the concentrate/extract cartridge adapted to hold a fluid chemical or additive to be dispensed into the dispensing housing, the concentrate/extract cartridge including a hollow body, a dispensing tube connected to the hollow body, a piston located in the dispensing tube, and a valve having a valve stem that passes through a port of a valve seat connected to the dispensing tube, the port defining a flow passage through the dispensing tube, and a valve body located at a second end of the valve stem in removable contact with the valve seat, for alternately opening and closing the port the valve stem is connected to the piston at a first end of the valve stem, the piston comprising spaced apart internal webs with a ring connecting the webs, an external ferromagnetic material sleeve located around the external ring and a membrane configured to permit a flow of fluid into the dispensing tube when the valve body is in contact with the valve seat and to forcibly express the fluid from the dispensing tube when the piston is moved downwardly and the valve body is moved from a contact position with the valve seat, and a controller to control the actuator to discharge concentrate/extract from the cartridge;
a user inserting a selected cartridge with a pool or pond chemical or additive into the dispensing housing, with the dispensing tube located in the cartridge receiving opening;

a controller activating the electromagnetic dispensing actuator by sending an intermittent current to the actuator causing the piston to reciprocate back and forth and forcibly expressing a precise measured amount of the pool or pond chemical or additive from the dispensing tube and into a stream of water as it is being fed to the pool or pond.

32. A method of dispensing chemicals or additives through a sprinkler system, comprising:

providing a dispensing housing that is connected into a sprinkler system water feed line, the dispensing housing having at least one cartridge receiving opening with an associated electromagnetic dispensing actuator; a concentrate/extract cartridge removably insertable into each of the at least one cartridge receiving openings in a position to be actuated by the associated dispensing actuator, the concentrate/extract cartridge adapted to hold a fluid chemical or additive to be dispensed into the dispensing housing, the concentrate/extract cartridge including a hollow body, a dispensing tube connected to the hollow body, a piston located in the dispensing tube, and a valve having a valve stem that passes through a port of a valve seat connected to the dispensing tube, the port defining a flow passage through the dispensing tube, and a valve body located at a second end of the valve stem in removable contact with the valve seat, for alternately opening and closing the port the valve stem is connected to the piston at a first end of the valve stem, the piston comprising spaced apart internal webs with a ring connecting the webs, an external ferromagnetic material sleeve located around the external ring and a membrane configured to permit a flow of fluid into the dispensing tube when the valve body is in contact with the valve seat and to forcibly express the fluid from the dispensing tube when the piston is moved downwardly and the valve body is moved from a contact position with the valve seat, and a controller to control the actuator to discharge concentrate/extract from the cartridge;

a user inserting a selected cartridge with a chemical or additive into the dispensing housing, with the dispensing tube located in the cartridge receiving opening;

a controller activating the electromagnetic dispensing actuator by sending an intermittent current to the actuator causing the piston to reciprocate back and forth and forcibly expressing a precise measured amount of the chemical or additive from the dispensing tube and into a stream of water as it is being fed to the sprinkler system.

33. A method of dispensing a beverage comprising:

inserting a selected cartridge with a desired beverage concentrate/extract into the dispensing housing in the appliance of claim 1, with the dispensing tube located in the cartridge receiving opening;

pressing a button to signal the controller to activate the electromagnetic dispensing actuator;

the controller sending an intermittent current to the actuator causing the piston to reciprocate back and forth and forcibly expressing a precise measured amount of the concentrate/extract from the dispensing tube and into a stream of water as it is being dispensed.

34. The method of claim 33, wherein the appliance is refrigerated and the water is cold.

* * * * *